July 26, 1966
R. W. DAVIDSON
3,262,588
CARGO HANDLING APPARATUS
Filed July 19, 1963
12 Sheets-Sheet 1
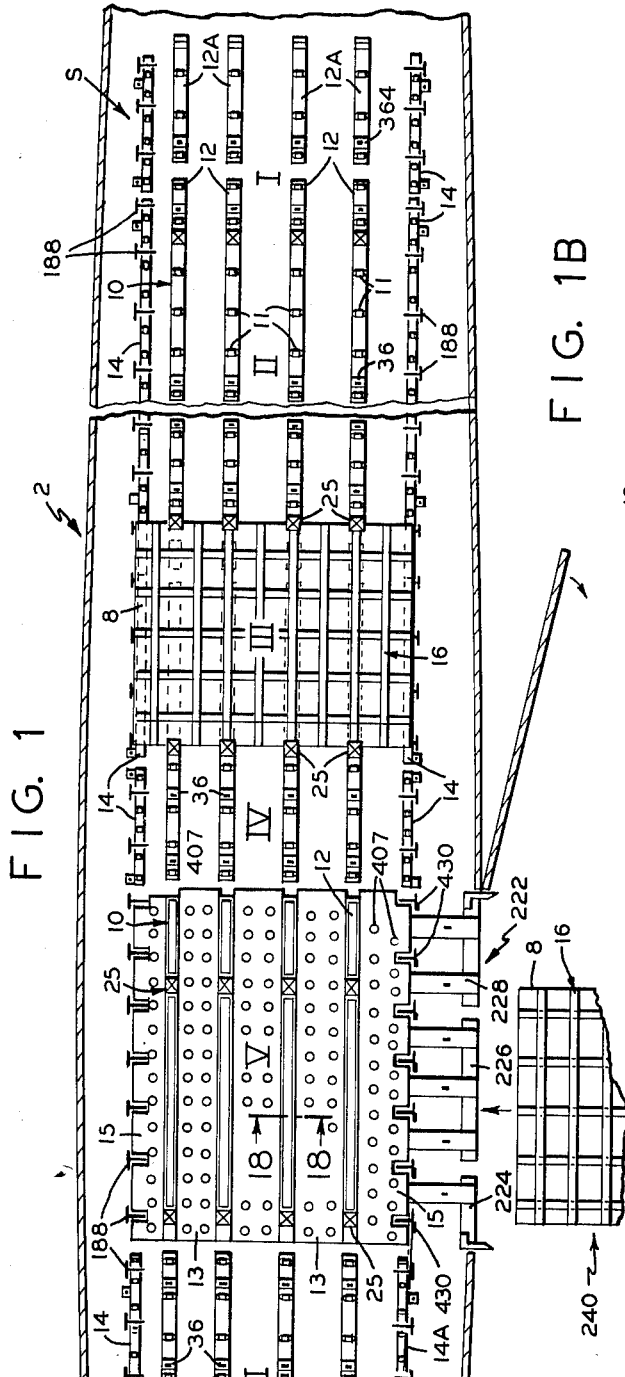
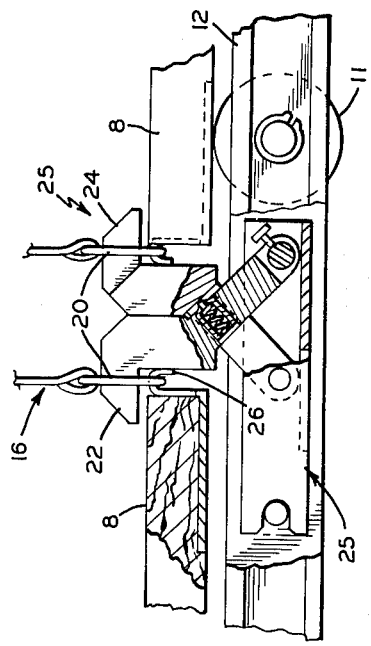
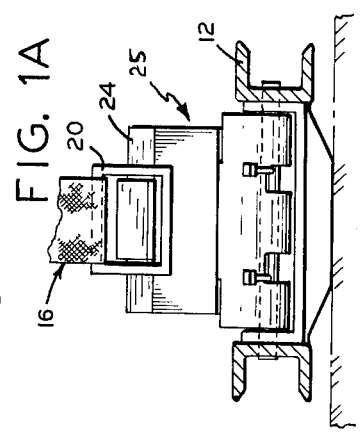
INVENTOR.
ROBERT W. DAVIDSON
BY
ATTORNEY.

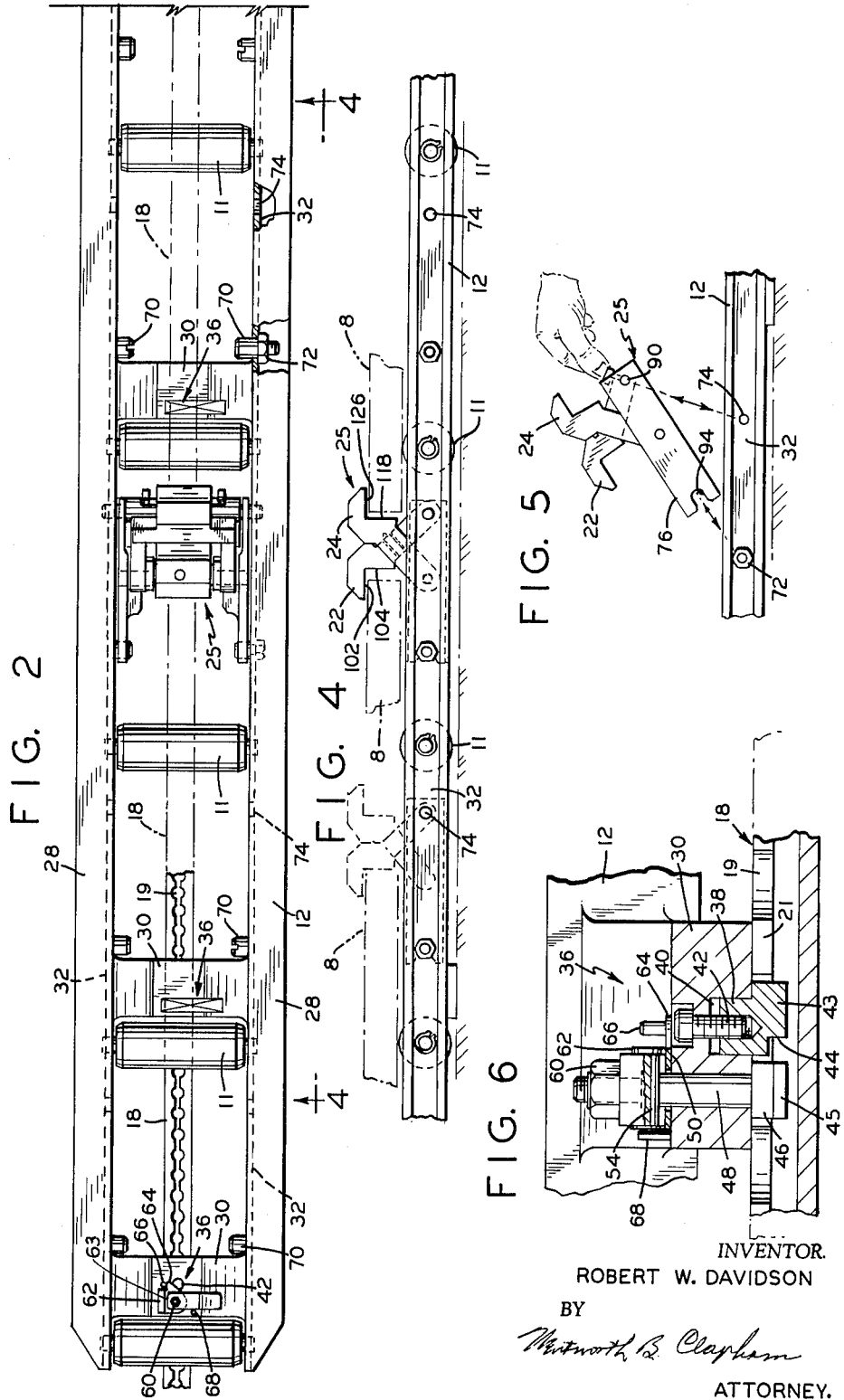

July 26, 1966   R. W. DAVIDSON   3,262,588
CARGO HANDLING APPARATUS
Filed July 19, 1963   12 Sheets-Sheet 3
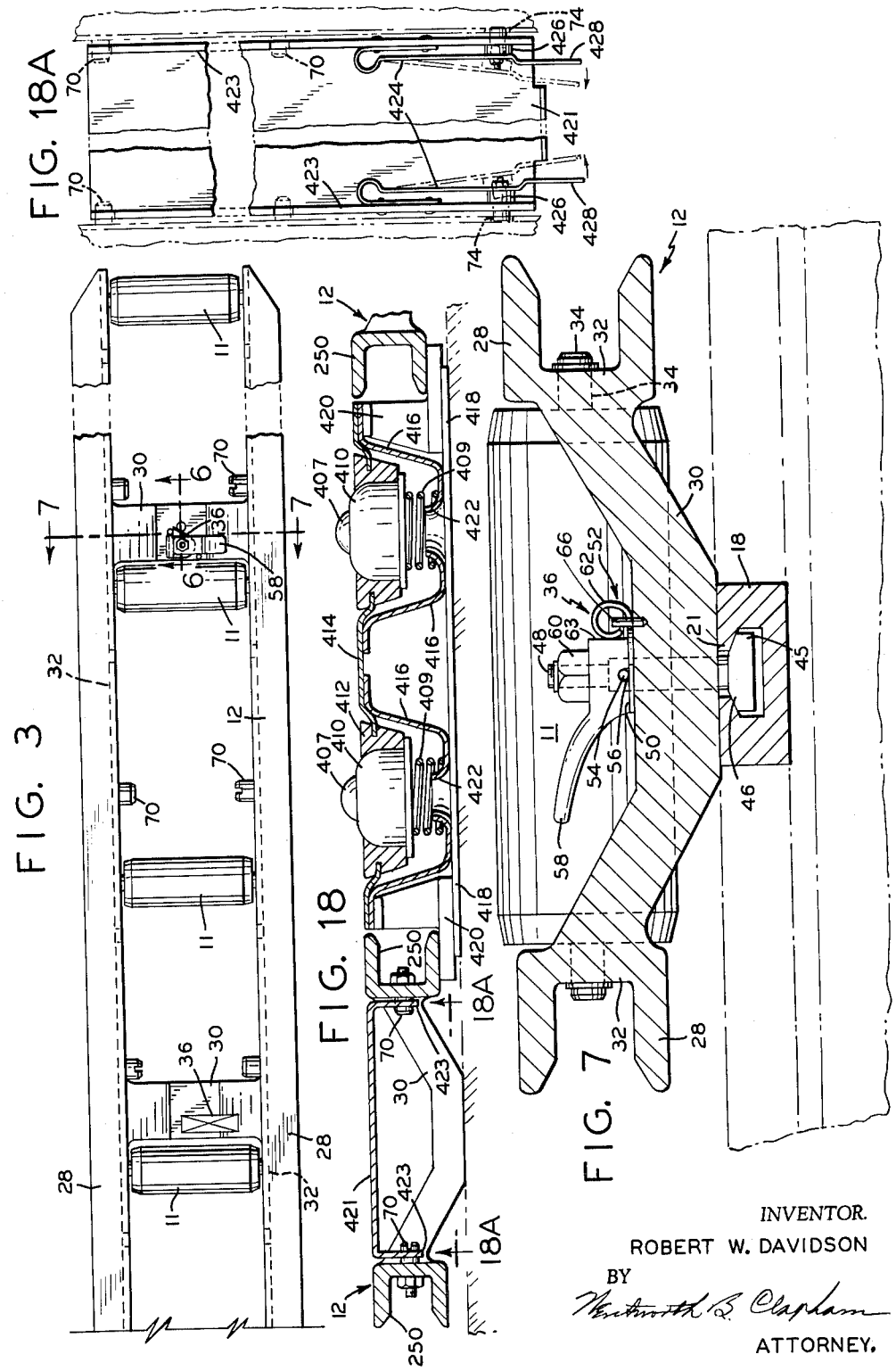
INVENTOR.
ROBERT W. DAVIDSON
BY
Wentworth B. Clapham
ATTORNEY.

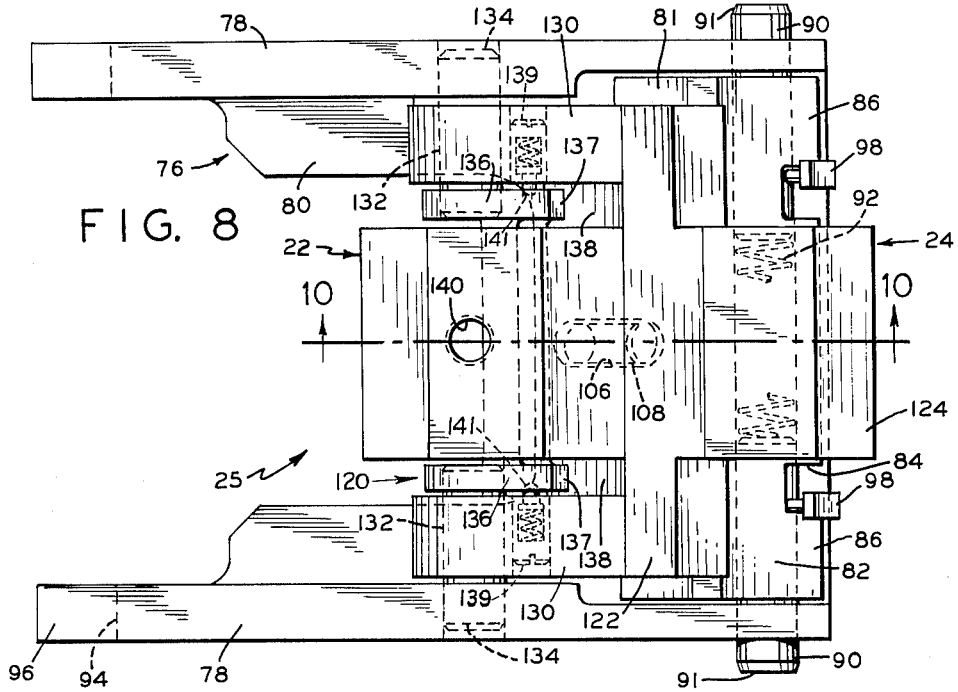
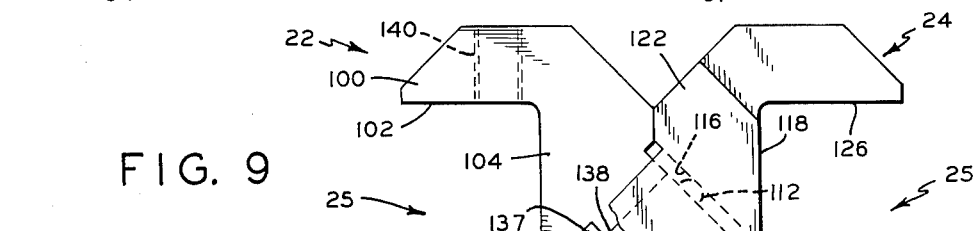
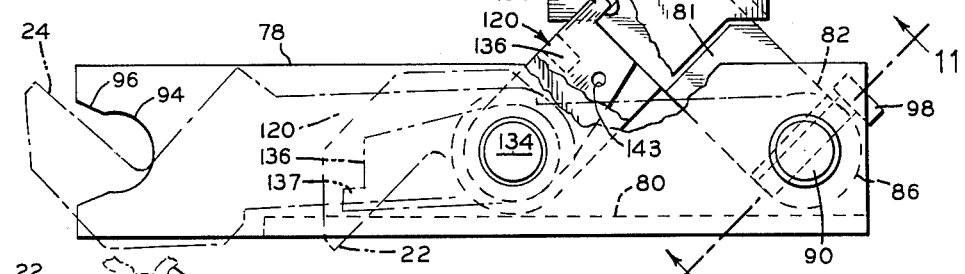

July 26, 1966 R. W. DAVIDSON 3,262,588
CARGO HANDLING APPARATUS

Filed July 19, 1963 12 Sheets-Sheet 5

INVENTOR.
ROBERT W. DAVIDSON
BY
Wentworth B. Clapham
ATTORNEY.

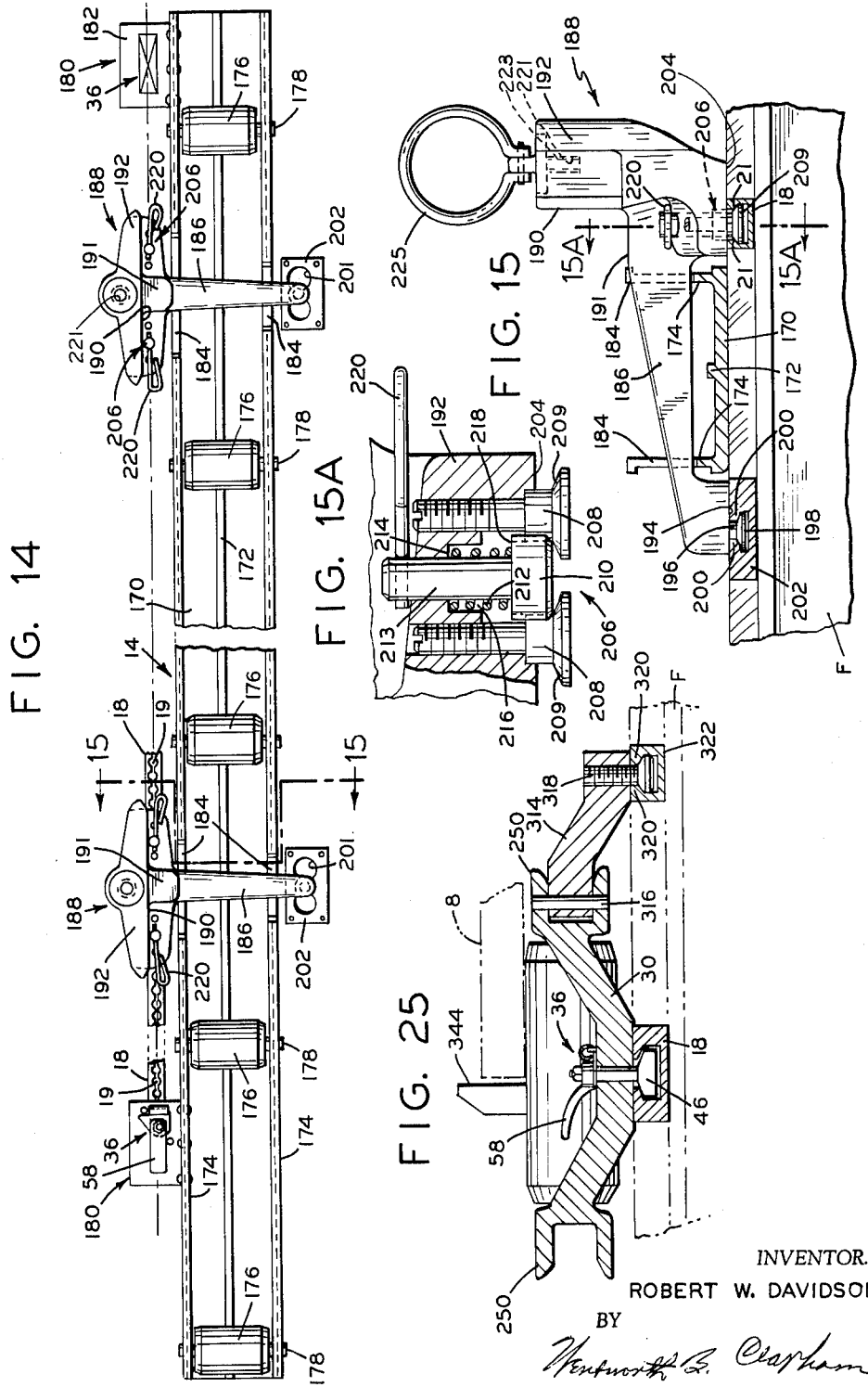

July 26, 1966 R. W. DAVIDSON 3,262,588
CARGO HANDLING APPARATUS
Filed July 19, 1963 12 Sheets-Sheet 7
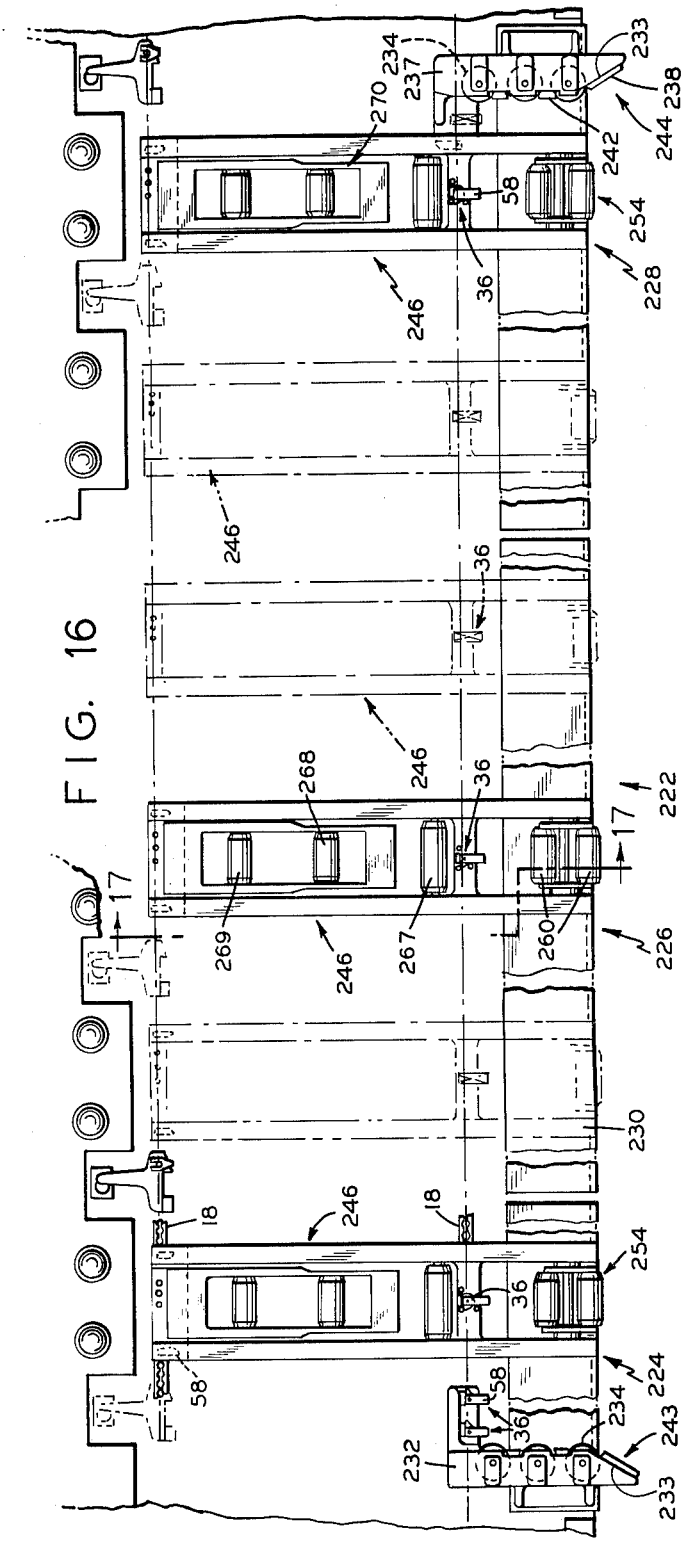
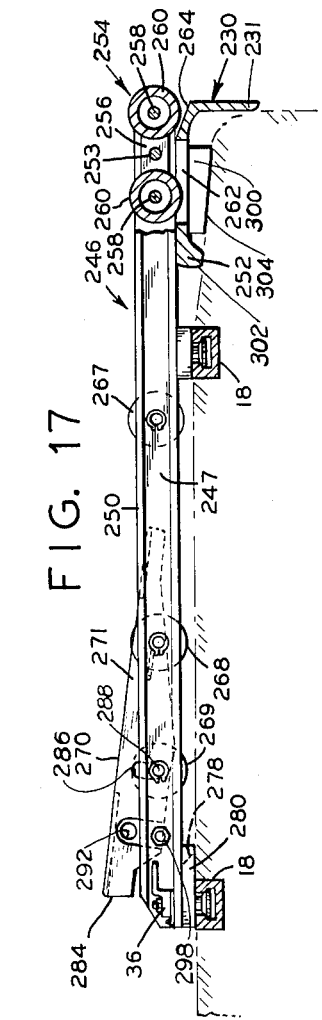
INVENTOR.
ROBERT W. DAVIDSON
BY
ATTORNEY.

July 26, 1966   R. W. DAVIDSON   3,262,588
CARGO HANDLING APPARATUS
Filed July 19, 1963   12 Sheets-Sheet 8
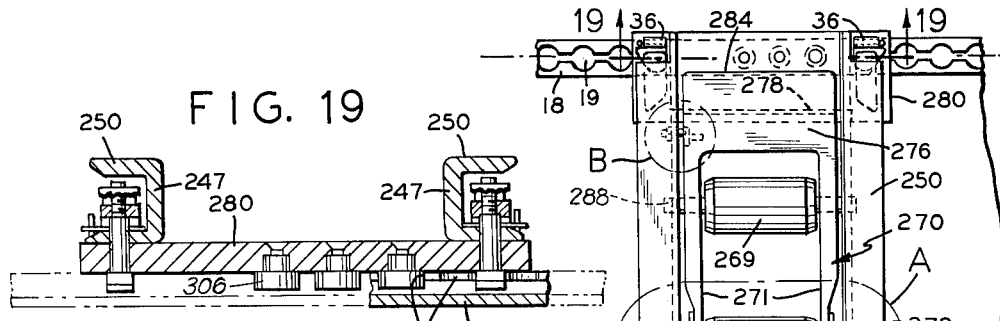
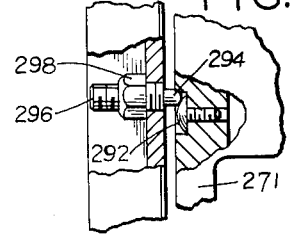
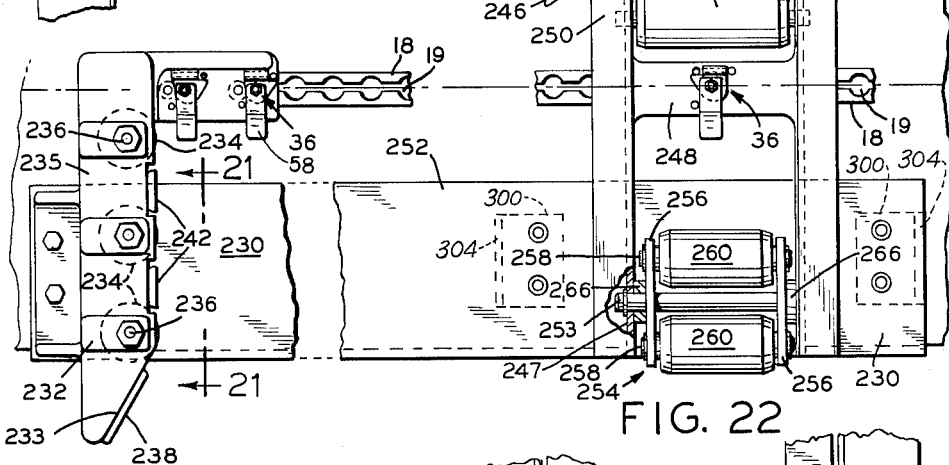
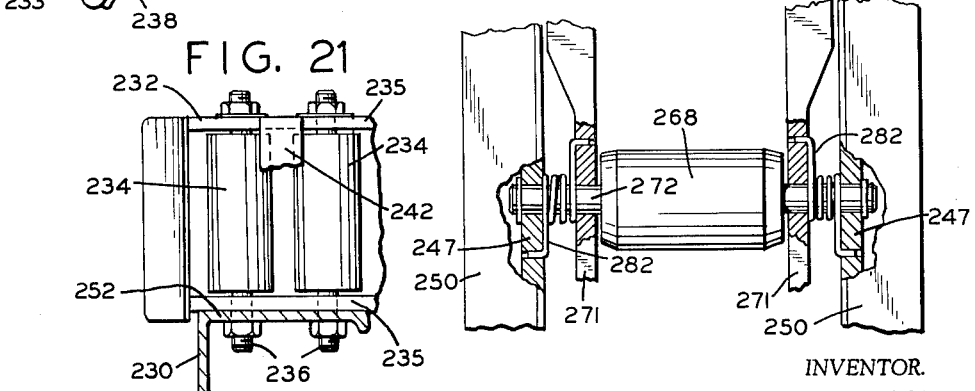
INVENTOR.
ROBERT W. DAVIDSON
BY
Wentworth B. Clapham
ATTORNEY.

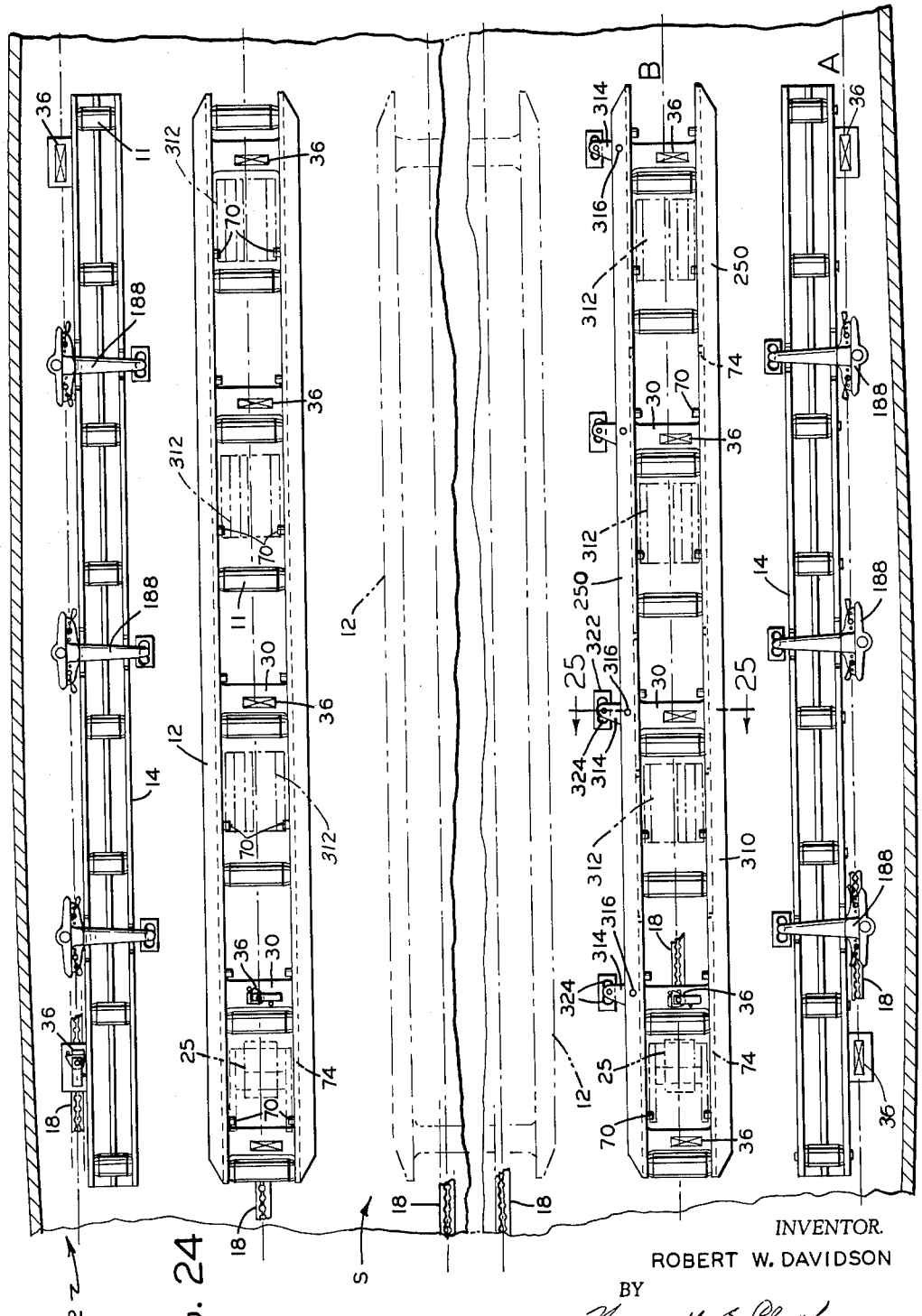

July 26, 1966  R. W. DAVIDSON  3,262,588
CARGO HANDLING APPARATUS
Filed July 19, 1963  12 Sheets-Sheet 10

INVENTOR.
ROBERT W. DAVIDSON
BY
*Wentworth G. Clapham*
ATTORNEY.

July 26, 1966  R. W. DAVIDSON  3,262,588
CARGO HANDLING APPARATUS

Filed July 19, 1963  12 Sheets-Sheet 11

INVENTOR.
ROBERT W. DAVIDSON
BY
Wentworth & Clapham
ATTORNEY.

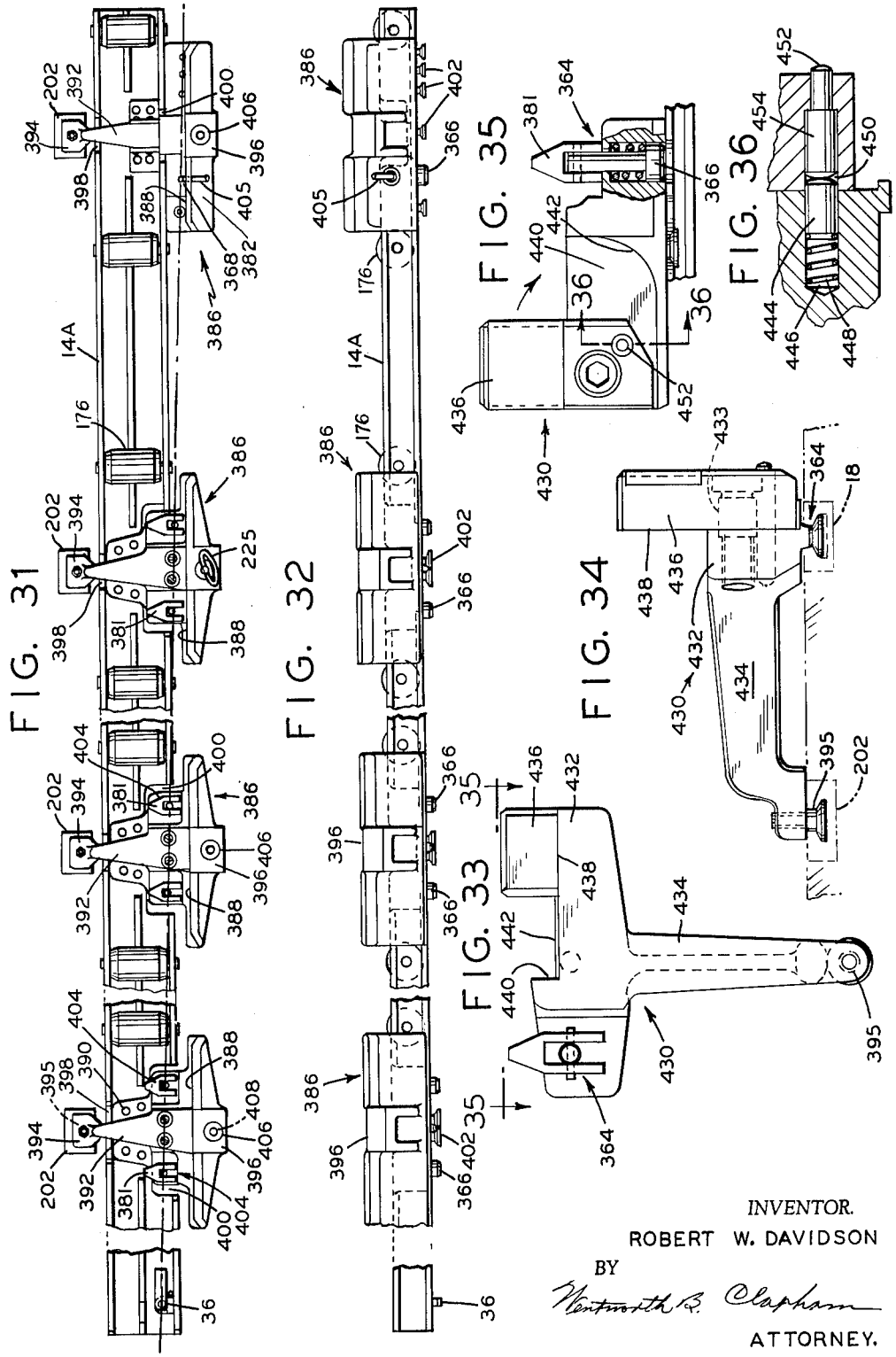

United States Patent Office 3,262,588
Patented July 26, 1966

3,262,588
CARGO HANDLING APPARATUS
Robert W. Davidson, Greenwich, Conn., assignor to American Machine & Foundry Company, a corporation of New Jersey
Filed July 19, 1963, Ser. No. 296,177
29 Claims. (Cl. 214—84)

This invention relates to cargo handling apparatus and more particularly to improvements in apparatus which is operative to restrain palletized or containerized cargo against movement under all load conditions which may occur while vehicles which are transporting such cargo are in motion.

The present invention is readily adaptable for use in all types of commercial vehicles such as trucks, railroads, cars, ships and aircraft. However, it finds particular applicability in high speed carriers, such as modern airplanes, because of the fact that the apparatus embodying the invention is so designed and constructed that heavily loaded pallets can be rapidly loaded into an aircraft, and its load so secured that under all conditions of flight, including emergency crash landing conditions, the cargo will be securely maintained in safely locked condition against movement from the time it leaves its point of departure until it is delivered at its destination.

The ever increasing size and speed of commercial carriers, such as aircraft, cause serious problems in cargo loading and securing. The size and cost of modern airplanes and increased operating expenses are such that it is necessary to unitize, i.e., palletize or containerize, cargo in order that it can be handled and loaded rapidly, thereby insuring economical utilization of payload space, and minimize turn around time of crew and aircraft. Because the loads carried are very heavy (a modern cargo airplane can carry as much as 88,000 pounds), and loaded pallets or containers or units my weigh as much as 10,000 pounds, unless they are adequately secured against shifting or movement, and in such manner that requirements of the Federal Aviation Agency are met, they can break loose and become, in effect, missiles, which obviously would endanger the lives of the crew of the carrier in which they are being transported. This is especially the case in the shipment of cargo in aircraft wherein all of the payload space may be devoted to transportation of cargo or freight, or where only a portion thereof may be used for cargo or freight and the rest being given over to the transportation of passengers. In such case if any portion of a cargo breaks loose the lives of the passengers and crew may be subject to constant danger of injury and even loss of life on take off, during flight or on landing, including emergency crash landings.

Attempts have been made heretofore to provide apparatus for securing palletized cargo or freight for transportation in vehicles, such as aircraft. However, even though pallets have been secured to the floor of the vehicle, it has been found necessary to use auxiliary securing means in order to provide for all contingencies which might arise during the movement of the carrier from point of departure to its destination. In the case of cargo carrying airplane it has been necessary to use barrier nets or transverse partitions between pallets and loads in longitudinally spaced arrangement within the carrier, such as an airplane, so that if for any reason a palleted load should break loose from its securing means the barrier nets or transverse panels would prevent "missiling" of the breakaway load. Many other schemes have been tried to solve the problem of providing satisfactory load securing means for insuring safe transport of freight in flight under all conditions as takeoff, flight, landing and possible survivable crash landing of an airplane. As in the case of the invention disclosed in my copending application Serial No. 261,930, the present invention is capable of meeting the requirement of the Federal Aviation Agency that the cargo handling system be able to withstand a force of nine times gravity or a force of 9 $g$'s without breakaway failure of the cargo handling apparatus.

The present invention constitutes a solution of the problems mentioned above because it provides a cargo handling apparatus or system in which a palletized load is so contained that the pallet per se can play a small part in the successful resistance of force imposed upon the load under all conditions of travel. This is due to the fact that the containing means for a load on each pallet can be so secured by mechanism embodying the invention to the floor of the carrier such that even under the most severe flight conditions total loads up to the certified payload carrying capacity can effectively withstand nine times the force of gravity or 9 $g$'s without failure.

The cargo handling apparatus embodying the invention also is extremely versatile in use because it can satisfactorily handle and secure loads which are supported on extremely simple, inexpensive pallets, and also function equally well in securing heavy, rigid pallets, i.e. military air service type, for safe transportation from point of departure to a destination when the cargo is removed from the carrier.

Apparatus embodying the invention constitutes improvements to that disclosed in my copending application Serial No. 261,930, filed February 11, 1963, for Cargo Handling Apparatus. In accordance with the invention is it possible to install in a cargo carrying vehicle practically any desired cargo holding and securing pattern. In this manner a large number of different type and sizes of pallets or load supporting means can be handled satisfactorily with the assurance that each load will be secured properly in the vehicle for transportation.

The apparatus disclosed herein embodying the invention can be termed a modular system. This is because each set or group of transversely spaced and arranged roller trays or conveyors is detachably connected to the seat rails or other suitable securing means mounted to the floor structure of the carrier, such as an airplane, in which they are installed such that each group can operate as a load securing entity regardless of whether or not other sets or groups or roller trays or conveyors are in operation. Also means are provided for readily adapting the system to accommodate pallets of different lengths and widths. Thus the loading pattern in a given carrier can be conformed to meet any particular loading problem.

This construction assures great versatility and flexibility in the rapid loading and unloading of cargo because it enables the operator to meet successfully the problems with which he may be faced. For example, it may be desirable to install but a single unit of modular trays and terminal trays, described in detail hereinafter, in forming a single pallet or load unit supporting station. It can be seen that all the attached hardware which would be required for such an installation is confined essentially to the area utilized by a pallet or loaded unit which leaves the remainder of the aircraft floor unobstructed and available for use with other types of unpalletized cargo, i.e., passengers, large animals, heavy machinery, automobiles. If two or more stations are required, each station would comprise an additional modular installation consisting of laterally disposed spaced modular trays or roller conveyors.

It is a further object of the invention to provide a novel cargo handling apparatus for a cargo carrier, such as an airplane, having roller trays mounted in the carrier, provided with detachable locking units which can be installed at selected positions in the trays, and guide units associated with the roller trays which make it possible to adapt the apparatus for rapid conversion for handling and securing pallets all of one size or of differing sizes within a selected range so that cargo can be transported safely without failure under the most rigorous conditions imposed upon a carrier under any and all conditions to which the carrier may be subjected during its travel from a point of departure to its destination.

It is a further object of the invention to provide a novel cargo handling apparatus which is capable of handling very heavy as well as light weight palletized loads and in which the load can be directly secured to the floor of the carrier so that the pallet plays but a small part in the safe, secure, attachment of the load to the floor of the carrier for transportation.

The invention is further characterized by the provision of a plurality of tracks formed of tandemly arranged roller trays which trays are provided with opposed sets of locking dogs operative to secure the container or a palletized load to the floor of a carrier, such as an airplane, in order that each palletized load transported by the airplane will be safely secured against any failure or breakaway, during the most severe conditions including a survivable crash landing to which the airplane may be subjected.

The invention is further characterized by the provision of a novel cargo handling apparatus wherein there is provided on the floor of an airplane or other carrier in which the apparatus is installed a plurality of laterally spaced tracks formed of tandemly arranged roller trays which allow loaded pallets to be moved without difficulty onto selected spaced portions thereon where each load on each pallet can be secured by locking dogs detachably mounted in the trays to the floor of the airplane in such manner that even under the most adverse flying conditions including the subjection of the loads on the pallets to forces of nine times gravity, the loads will not break loose but will be carried safely to their destination.

The invention is further characterized by a novel cargo handling apparatus for use in carriers, such as airplanes, wherein the floor of an airplane is provided with a novel load supporting floor track system upon which loads can be moved to a specified transport position and wherein locking means are so mounted and disposed with respect to the tracks of the system that pallets being moved to the transport position within the planes do not present any obstruction to the motion of the pallets and wherein after the pallets have been positioned in their transport positions the locking means are moved into operative relationship either with the pallets or with securing means which contain the cargo on the pallets such that the loads on each pallet can withstand even the severest conditions of flight to which an airplane may be subjected without breakaway which would endanger the lives of the passengers or crew.

The invention further consists in the provision of a novel cargo handling apparatus having a novel conveyor supporting system including roller tracks and detachable locking means and guide means associated with the tracks for use in securing loads in carriers, such as airplanes which are so constructed that during the loading of an airplane the locking means and certain of the guide means are disposed in inoperative position but which, after the loads are located in proper position within a plane the locking means and guide means can be moved into operative load holding positions such that during transportation of the loads and even under the worst possible condition of flight in the case of an airplane, including the subjection of a load to forces equal to nine times gravity, i.e., 9 g's, the locking means will so secure the load that there is no danger of breakaway or shifting of the loads during flight.

A further object of the invention is to provide a novel modular cargo handling system comprising one or more stations which can be detachably installed in a carrier in accordance with a predetermined locking pattern in order to meet each particular problem which arises in the handling of various types of cargo or freight.

It is a further object of the invention to provide a novel cargo handling apparatus wherein in an aircraft having two or more consecutive stations, a further means is provided for positioning and maintaining loaded pallets at selected locations by means of detachable locking units, which can be repositioned as desired, including locking dogs, for coaction with the loaded pallets for purposes of weight distribution to secure them at such locations.

The invention is further characterized by the provision of a novel cargo handling apparatus having pallet supporting roller conveyor trays in which means are provided for detachably supporting locking dog units and wherein these units can be removed from the trays and repositioned therealong as desired, and wherein, due to the novel construction of the locking units and their supporting trays, loaded pallets secured upon the trays can be closely adjacent or spaced from each other in order to distribute weight properly in the aircraft. It is sometimes desirable to have an aisle alongside the cargo for inspection purposes, fire fighting or as an escapeway and for interchange of pallets designed for use in a narrower or lesser width airplane. Therefore, the invention further consists in the provision of novel mechanism in the form of selectively operated side guide mechanism which makes it possible for all or selected portions only of the cargo space in an aircraft to handle pallets of a lesser width than that for which the system normally is designed to handle. This can be done without disturbing or sacrificing the other adjustable features of the system.

It is a further object of the invention to provide a novel cargo handling system capable of handling unitized loads and one in which loading and unloading of cargo can be effected in a minimum of time.

With these and other objects not specifically mentioned in view, the invention consists in the novel features pointed out and described more in detail hereinafter, and set forth in the claims hereunto appended.

FIGURE 1 is a somewhat diagrammatic partial plan view showing a preferred embodiment of the invention installed in a vehicle, such as an airplane.

FIGURE 1A is an end view of a locking unit in operative position.

FIGURE 1B is a side view, partly in section, of the unit shown in FIGURE 1A.

FIGURES 2 and 3 taken together constitute a plan view of a typical inner roller tray or rail embodying the invention.

FIGURE 4 is a side view taken on line 4—4 in FIGURE 2.

FIGURE 5 illustrates one way in which a locking unit is installed or removed from a roller tray.

FIGURE 6 is a partial sectional view of a locking fitting taken on line 6—6 in FIGURE 3.

FIGURE 7 is a sectional view taken on line 7—7 in FIGURE 3.

FIGURE 8 is a plan view of a preferred embodiment of locking unit.

FIGURE 9 is a side view of the unit shown in FIGURE 8.

FIGURE 10 is a partial sectional view taken on line 10—10 in FIGURE 8.

Figure 11:
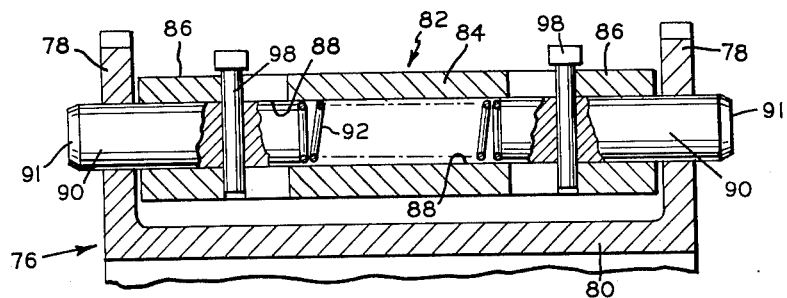

FIGURE 11 is a view taken on line 11—11 in FIGURE 9.

Figure 12:
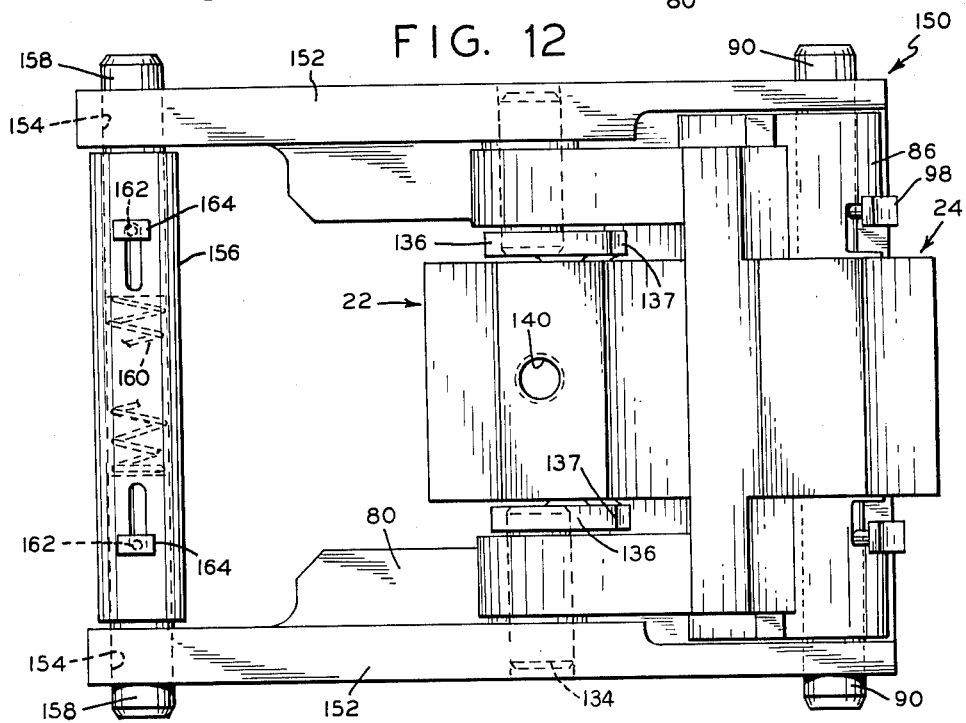

FIGURE 12 is a plan view of a modified form of locking unit.

Figure 13:
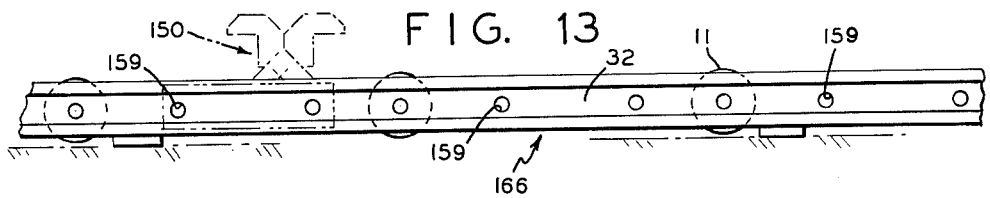

FIGURE 13 is a side view of a modified form of roller tray or rail for use with the unit shown in FIGURE 12.

FIGURE 14 is a plan view of an outer or guide tray or rail.

FIGURE 15 is a view taken on line 15—15 in FIGURE 14.

FIGURE 15A is a view taken on line 15A—15A in FIGURE 15.

FIGURE 16 is a plan view of a preferred form of infeed conveyor system embodying the invention.

FIGURE 17 is a view taken on line 17—17 in FIGURE 16.

FIGURE 18 is a sectional view on line 18—18 in FIGURE 1.

FIGURE 18A is a view taken on line 18A—18A in FIGURE 18.

FIGURE 19 is a sectional view taken on line 19—19 in FIGURE 20.

FIGURE 20 is a plan view of one of the components of the structure shown in FIGURE 16.

FIGURE 21 is a view taken on line 21—21 in FIGURE 20.

FIGURE 22 is a view, partly in section, of a detail shown in area "A" of FIGURE 20.

FIGURE 23 is a partial sectional view of the detent means shown in area "B" of FIGURE 20.

FIGURE 24 is a plan view of a modified form of the invention installed in a vehicle or carrier, such as an airplane.

FIGURE 25 is a view taken on line 25—25 in FIGURE 24.

Figure 26:
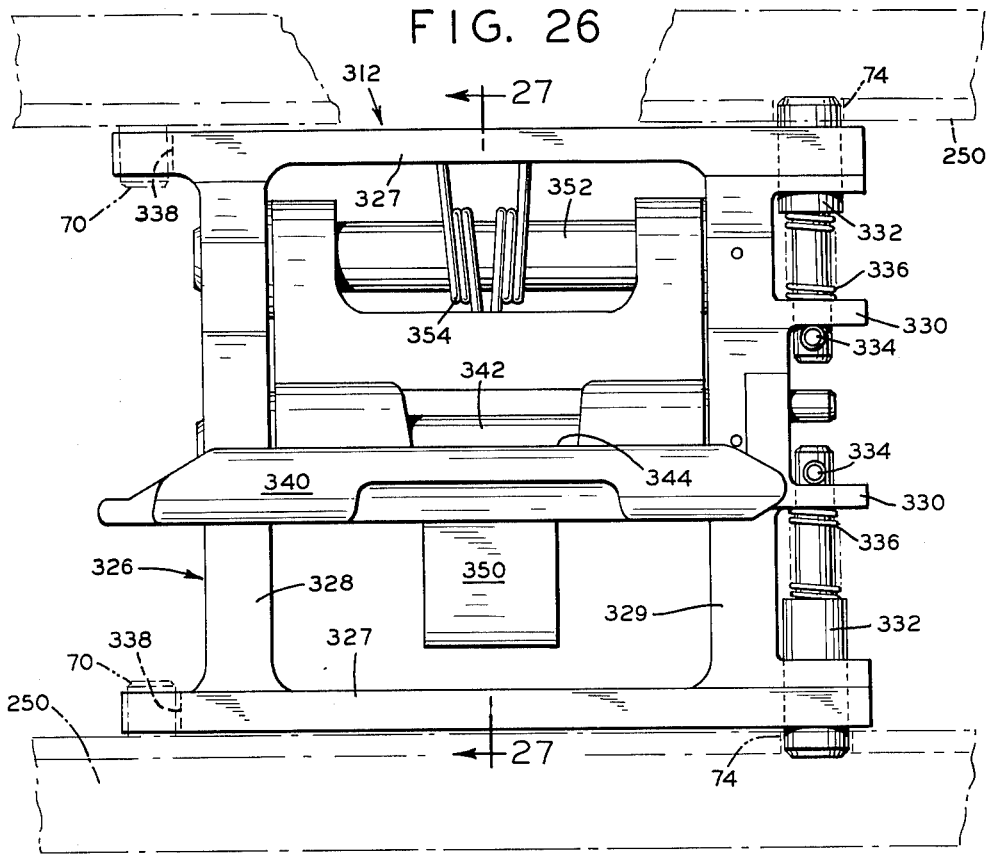

FIGURE 26 is a plan view of a modified form of side guide embodying the invention.

Figure 27:
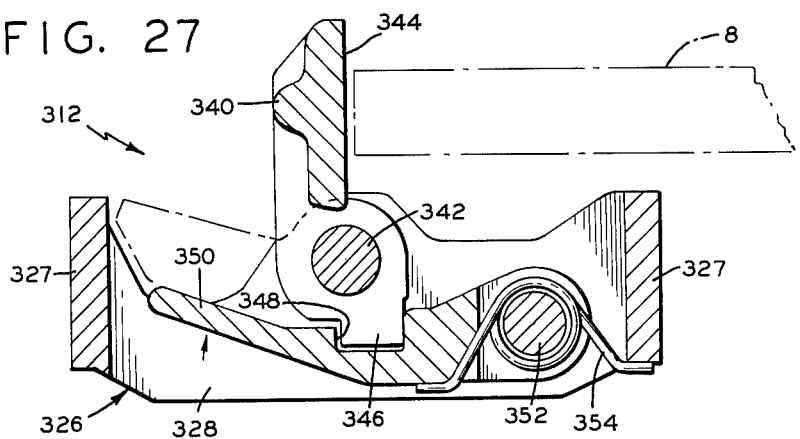

FIGURE 27 is a view taken on line 27—27 in FIGURE 26.

Figure 28:
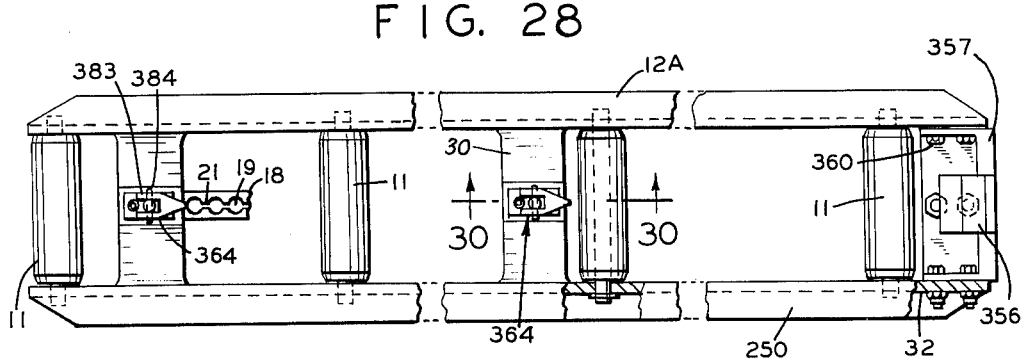

FIGURE 28 is a plan view of an end rail or tray.

Figure 29:
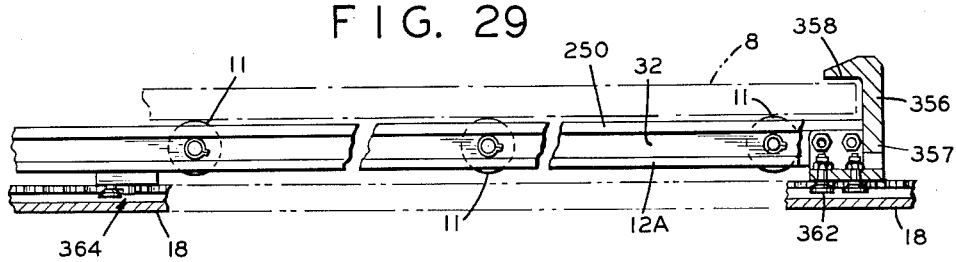

FIGURE 29 is a side view of the rail or tray shown in FIGURE 28.

Figure 30:
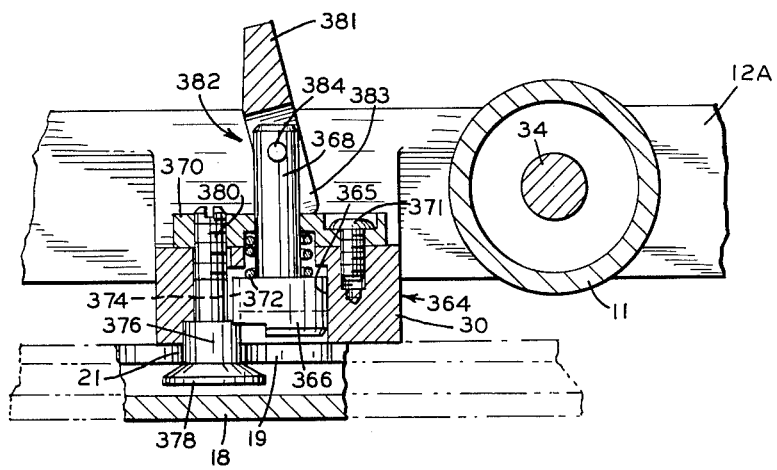

FIGURE 30 is a cross-sectional view of a modified form of locking fitting.

FIGURE 31 is a plan view of a modified form of side guide and roller conveyor assembly embodying the invention.

FIGURE 32 is a side view of the assembly shown in FIGURE 31.

FIGURE 33 is a plan view of a retractable side guide.

FIGURE 34 is a side view of the guide shown in FIGURE 33.

FIGURE 35 is a view taken on line 35—35 in FIGURE 33, and

FIGURE 36 is a view taken on line 36—36 in FIGURE 35.

The system embodying the invention is designed primarily for use in cargo carrying aircraft although it can also be used satisfactorily in other types of carriers, such as railroad cars, trucks, and ships. It is light weight and strong in construction and is capable of withstanding extremely high omnidirectional forces without failure or breakaway of loaded pallets. For example, the total payload for which a typical system is designed (13 units or cargo loaded pallets) is 114,000 pounds, which means that it can satisfactorily restrain against the developed force of 1,000,000 pounds.

Referring to the drawings, FIGURE 1 discloses a carrier, in this case an airplane 2 provided with a door 4 through which cargo, generally loaded on pallets 8 is loaded and unloaded in airplane 2. Any suitable conventional device (not shown) can be used for loading and unloading cargo into airplane 2. The floor of airplane 2 is provided with a novel roller conveyor system embodying the invention designated generally S.

As shown in FIGURE 1, there are several stations where loaded pallets 8 can be held securely against movement until it is desired to unload the airplane and remove one or all of the loaded pallets. In FIGURE 1, a loaded pallet is shown located at a station designated III. This pallet can, of course, be moved on roller conveyor system S in the loading of the aircraft to any other station as hereinafter described. Suffice it to say when each loaded pallet is located at a selected station it is held securely at that station against movement by mechanism described more in detail hereinafter.

System S comprises a plurality of elongated tracks designated generally 10, which preferably are detachably secured to the floor of airplane 2. Tracks 10 are provided with longitudinally spaced low friction conveyor means, such as rollers 11, as shown in FIGURES 1, 2 and 3. These tracks extend longitudinally along the floor of airplane 2 and their length is governed by the amount of space in airplane 2 given over to handling of cargo. In some aircraft all available space is used for cargo; in others part may be used for cargo and part for passengers.

In the system S shown installed in airplane 2 in FIGURE 1, tracks 10 comprise four inner conveyor trays 12 and two outer trays 14. The length of trays 12 and 14 constituting a track 10 can be varied as required in order to meet the requirements for installing a system S in the allotted space available in a carrier. This construction of the system insures great flexibility not only in installation in an aircraft or other carrier, but also makes possible the best uses of cargo space and provides for a different location of pallets. Furthermore, it provides for the proper distribution of weight in order to obtain proper distribution of weight and balance in an aircraft.

Loaded pallets 8 are moved on ball mats 13 and 15, of suitable conventional design, and conveyor tracks or trays 12 and 14 into predetermined flight positions or locations, as at stations I, II, III, IV, V and VI, between locking dog units 25 at the ends of each securing station I–VI, described more in detail hereinafter.

Cargo loaded on a pallet 8 is contained thereon by means of a net 16 comprising crossing tapes preferably formed of nylon or other suitable high-strength material. As shown in FIGURES 1A and 1B, the terminal ends of the downwardly extending tapes at the fore and aft ends of a pallet as loaded into airplane 2, and provided with metal rings 20 through which locking dogs 22 and 24 extend. As illustrated in FIGURE 1B, locking dogs 22 and 24 of a locking dog unit, designated generally 25, are shown in operative relationship with respect to two pallets 8 arranged in end to end relationship, as for example at stations I and II or stations II and III, in airplane 2 shown in FIGURE 1. Rings 20 engage hooks 26 which are mounted along the edge of pallet 8 much in the manner as that shown in my copending application 261,930 filed February 11, 1963.

The laterally spaced arrangement of inner trays 12 and outer trays 14 preferably corresponds to the location of primary structure in the floor of an airplane. That is, each tray 12 and 14 is secured to seat rails or other suitable attachments mounted to or forming a part of the floor structure and extends longitudinally along the airplane floor above the floor structure. It will be appreciated, however, that trays 12 and 14 could be installed with a different spacing arrangement and still function satisfactorily. The use of already installed seat rails in a given aircraft contributes to the rapid installation and removal of system S in meeting its cargo carrying requirements.

FIGURES 2 and 3 taken together illustrate a preferred embodiment of a typical inner tray 12. Trays 12 and also trays 14 usually are formed from a light weight material, such as aluminum, or aluminum alloy, in order to reduce weight, and provide adequate strength. In the form selected for purposes of illustration, each tray 12 is formed in any suitable manner with two laterally spaced elongated channel portions 28 connected at substantially equidistant or other desired longitudinally spaced points by cross members 30, preferably formed integrally with channel portions 28. Thus, each tray 12 may be termed a unitary member. Referring to FIGURE 7, it will be seen that in a cross-sectional view taken through one of the cross members 30, track 12 resembles a flattened V. It has been found that this design provides not only a light weight construction, but also a tray which meets all requirements for strength and rigidity to which it may be subjected. Furthermore, because of this construction all of the weight upon trays is taken through the seat rails 18 directly to the floor beams F of the aircraft. The raised position of channel portion 28 relative to the floor of the airplane 2 insures that there will be ample clearance between rollers 11 and the floor thereof.

Channel portions 28 have vertical wall portions 32 in which are slidably supported shafts 34 carrying any suitable conventional type of low friction or ball bearing mounted transversely extending rollers 11. Rollers 11 are mounted in selected spaced arrangement along trays 12 and 14. In the type of tray 12 shown herein, rollers 11 are suitably spaced between cross members 30. The preferred arrangement on roller trays is in tandem as illustrated in FIGURE 1, and such that the spacing between the last roller 11 of one tray 12 and the first roller 11 of the next adjacent tray is approximately the same as the spacing between rollers 11 in each tray. The selection of trays 12, and trays 14 described hereinbelow, as to length depends upon the amount of space given over to cargo. The construction is such that continuous roller support is provided at all times. This insures ease of handling in moving pallets from one station to another in loading and unloading a carrier.

In order to install each tray 12 and provide for detachably securing it in its selected operative position in a carrier, such as airplane 2, each cross member 30 is provided with a locking fitting, designated generally 36. See FIGURES 1, 2, 3, 6 and 7. Since all fittings are essentially the same in construction and operation only one need be described in detail. A typical fitting 36 comprises a fixedly mounted cylindrical member 38 secured in a bore 40 in its respective cross member 30 by a screw 42 threadably supported therein. (See FIGURES 6 and 7.) Member 38 is provided with an enlarged seat rail engaging head portion 43 having a cut out section 44 which allows the outwardly extending flanges 45 on a locking head 46 secured to or formed integrally with a locking shaft 48 rotatably mounted in cross member 30 to be disposed in inoperative position relative to a seat rail 18 when a tray is being installed. Adjacent the upper surface of cross member 30 and above the flat portion 50 of a sheet metal spring 52 through which it projects, shaft 48 is provided with a cross key or pin 54. This key seats in a transverse slot 56 in the under face of the hub of lock-operating handle 58 secured to shaft 48 by means of a suitable conventional type of lock-nut 60 threadably mounted on the free end of shaft 48.

Lock operating handles 58 are shown in their operative positions in FIGURES 2, 3, 6 and 7. They are maintained in this position by an upwardly extending rolled part 62 of spring 52 against which bears shoulder 63 of handle 58. Spring 52 is provided with a nose 64 which engages a stop pin 66 mounted in cross member 30 closely adjacent rolled part 62 of spring 52. In this manner when handle 58 is turned to and from locking position, spring 52 is prevented from moving out of its proper assembled operative position. Stop pin 66 also limits the extent of movement of handle 58 to its inoperative position. A second stop pin 68, mounted in cross member 30 limits the extent of movement of handle 58 to its operative or locking position. As shown in FIGURES 6 and 7, locking head 46 and head portion 43 extend beyond the under surface of cross members 30.

In the installation of a tray 12, all locking handles 58 are turned counter clockwise 90° from the positions shown in FIGURES 2 and 3 so that one flange 45 of each locking head 46 is disposed in the cut out section of its respective coacting head portion 43. The tray is then so positioned relative to the selected seat rail 18 that all of the head portions 43 move into seated relationship with the circular openings 19 in seat rail 18. When this is done, all handles 58 are turned 90° or clockwise into the full line positions, as viewed in FIGURES 2 and 3, whereby all locking flanges 45 are disposed in their locking positions beneath projections 21 of seat rails 18 as shown in FIGURE 7, thereby effecting a rigid, detachable attachment of a tray 12 to the floor of airplane 2, or other selected carrier.

In the drawings several complete illustrations of locking fittings 36 have been shown. However, in order to avoid the necessity of such repeated illustrations of the same part, this same part also has been shown schematically in the form of a rectangle with an X enclosed therein or as a rectangle with a solid black rectangle enclosed therein (see FIGURE 1).

An important feature of the invention is the provision of a novel construction, wherein for the first time in the art the locking means of a cargo handling apparatus can be moved from one selected position to another with great ease and dispatch. This novel construction makes it possible to adapt an installation in such manner that practically any length of pallet can be handled. In the same manner a plurality of pallets of different lengths can be locked against movement and transported at the same time. These important advantages and novel results are obtained by providing a tray construction wherein the locking units 25 comprising dogs 22 and 24, can be readily detached from their respective trays 12 and be remounted at selected positions therein corresponding to requirements depending upon the size of pallets to be carried.

As shown in FIGURE 4, the frequency of position selections that are made available for detachably mounting locking units 25 serves a further purpose in addition to that of accommodating different length pallets in that they permit a selection of positions in small increments for securing pallets within the aircraft such that optimum disposition of the load with respect to the center of balance of the aircraft may be accomplished. The positions provided for detachably mounting locking units 25 permit the securing of pallets in consecutive tandem arrangements or in spaced out arrangements as well as in random combinations thereof.

A preferred embodiment of the mechanism for effecting the removal and relocation of units 25 is shown in FIGURES 2, 3, 4, 5 and 9–11. Referring now to FIGURES 2, 3, 4 and 5, it will be seen that in the spaces between rollers 11, walls 32 support sets of opposed aligned studs 70 which provide mounting supports for locking units 25. Studs 70 are provided with a reduced portion (not shown) supported in holes in walls 32. Their free ends are threaded so that lock nuts 72 of a suitable conventional design can be turned home thereon to secure studs in assembled arrangement in trays 12. Walls 32 of channel portions 28 also are provided with longitudinally spaced bores 74 whose centers are horizontally aligned with the centers of studs 70. Thus when units 25 are assembled in a tray 12, their frames 76 and dogs 22 and 24 carried thereby will be properly positioned therein.

From a reference to FIGURE 1, and from what has been said hereinabove concerning the provision of mounting mechanism for locking dog units 25, it will be understood that depending upon its length each tray can support one or more locking units, except in the case of a very short tray 12 mounting a single transverse roller 11. Certain trays shown at the extreme right in FIGURE 1, described more in detail hereinafter may be provided with another type of locking device, and hence not require a lock dog unit 25.

FIGURES 2, 4, 5 and 8–11 disclose a preferred form of locking dog unit 25 as used in an installation such as shown in FIGURE 1. Because all these units are the same in construction and operation, it is considered necessary only to describe a single unit. Referring particularly to FIGURES 8–10, inclusive, unit 25 comprises a frame 76 having two elongated vertical side plates 78 connected by an integral transverse base plate 80. Side plates 78 support a front locking dog 22 and a rear locking dog 24, as viewed in FIGURES 1B and 4, wherein dog 22 coacts with the front end of a pallet 8 and dog 24 coacts with the rear end of an adjacent pallet 8 supported upon trays 12 and 14. The general principle of construction of dogs 22 and 24 is somewhat the same as that disclosed in my above referred to copending patent application Serial No. 261,930. However, the structure is markedly improved and the novel results obtained in versatility, flexibility of system, mounting and use constitute an important advance in the art.

Front dog 22, as shown in FIGURES 1B, and 8–10, comprises a block member 81 having at one end a base 82 provided with a central portion 84 and two side portions 86 with an axial bore 88 passing therethrough. Extending through each side plate 78 and bore 88 in each portion 86 and into central portion 84 is a slidable short shaft 90. Located in bore 88 in central portion 84 is a spring 92 which bears against the ends of shafts 90 and normally tends to maintain them projecting beyond the outer faces of plates 78 a distance equal to, or a little greater than the width of walls 32 of trays 12. The free ends of side plates 78 (see FIGURES 1B and 8–9) are provided with openings or support rests 94 and tapered guide surfaces 96 which assist in positioning support rests 94 and tapered guide surfaces 96 which assist in positioning support rests 94 in seated engagement with studs 70.

Each shaft 90 carries a suitable headed pin 98 extending outwardly therefrom at right angles into the space between central portion 84 and a side portion 86. Thus, when the mechanic installing a unit 25 presses both headed pins 98 together, spring 92 is compressed and the projecting ends 91 of shafts 90 are moved to a position flush with the outer faces of plates 78, at which time as indicated diagrammatically in FIGURE 5, unit 25 can either be lifted out of tray 12 or be installed therein. Upon release of pins 98, spring 92 in expanding forces shafts 90 outwardly to the position shown in FIGURE 8. If a unit 25 is being installed, the mechanic first engages openings 94 with studs 70 after which he swings frame 76 of unit 25 downwardly using studs 70 as a pivot center relative to a tray 12 until shafts 90 are aligned with holes 70. He then releases pins 98 so that when spring 92 expands, the ends 91 of shafts 90 become seated in holes 70 and the unit is ready for operation.

The other end of locking dog 22 comprises a locking lug 100 formed with a substantially horizontal face 102 and a substantially vertical face 104 at right angles thereto for securing a pallet 8 and/or a hold down ring 20, referred to hereinabove. In the preferred embodiment of the invention dog 22 also is provided with a bore 106 in which is threadably seated a spring activated spherical detent 108 preferably located centrally therein, as shown. Detent 108 comprises a spring 110 which bears against and urges pin 112 outwardly through an opening in detent cellar 114 into engagement with face 116 of block member 122 of rear locking dog 24. Detent 108 functions to exert a slight pressure on block member 122 tending to force dogs 22 and 24 apart, which effectively prevents lock latch 120 from moving out of its operative holding position, as by vibration, during flight or a trip. If desired the above described detent mechanism could be omitted without substantially affecting the operation of a locking unit 25.

If desired, one or both legs 130 of dog 124 may be provided with a detent device 139 similar to that shown in FIGURE 10, having a spherical member 141 adapted to engage a dimple 143 in lock latch 120 as an alternate means for maintaining it in latched position.

Locking dog 24 is complementary to dog 22 and comprises a transverse block 122 having a locking lug 124 with a planar under face 126 and a coacting planar face 118 substantially at right angles thereto. Block 122 has two spaced legs 130 having bores 132 at their free ends into each of which is press-fitted a short shaft 134, one of the ends of which extend into openings in plates 78 of frame 76 of unit 25. The other end of each shaft 134 supports a leg of latch lock 120 which is generally similar in design and operation as that disclosed in FIGURES 5 and 5B in my above referred to copending application. Latch lock 120 is provided with spaced locking arms 136 and noses 137 which coact with shoulders 138 of block 81. When dogs 22 and 24 are moved into the positions shown in FIGURES 1B, 4, 8, 9 and 10 and latch lock 120 is moved into its operative position, as described hereinabove, dogs 22 and 24 cannot move out of their operative positions until latch lock 120 is again moved to its inoperative position, as shown in broken lines in FIGURE 9.

Dog 22, if desired, may be provided with a tapped hole 140 into which a tie down ring unit of conventional design can be secured in order to adapt each or selected units to attach ropes, etc., which may be used to secure cargo.

FIGURES 12 and 13 disclose a modified form of locking unit, designated generally 150. In this embodiment, the free ends of side plates 152 which correspond to side plates 78 of a unit 25 (FIGURE 8) are provided with transverse holes or bores 154 instead of openings 94. A transverse sleeve 156 is supported between the free ends of plates 152 by two slidable short shafts 158, the free ends of which project through bores 154, extend beyond the ends of sleeve 158 and are adapted to seat in bores 159 formed in walls 32 of trays 12. A spring 160 located substantially centrally within sleeve 156 normally maintains short shafts 158 in extended positions beyond bores 154 in plates 152.

Short shafts 158 are moved to their retracted inoperative positions in sleeve 156 against the resilient pressure of spring 160 by means of pins 162, one end of each being secured in a short shaft 158. The other ends of pins 162 are provided with finger grips 164 of suitable design which allow a mechanic to engage and press them together to retract short shafts 158 into sleeve 156 so that unit 150 can be mounted in a desired selected position in tray 166, shown in FIGURE 13. Tray 166 is the same in construction and operation as tray 12, described hereinabove, except that studs 70 have been replaced by holes 159 which accommodate short shafts 158. Short shafts 90 and 158 can be of the same diameter such that units 150 can be mounted removably in a tray 166 with the free ends of side plates 152 extending either to the left or right in tray 166 as viewed in FIGURE 13. All other parts of unit 150 including short shafts 90 and their operating means are the same as in unit 25 and no further description is believed to be necessary to a full understanding thereof.

Outer or guide trays 14 extend along the floor of airplane 2 or other carrier in which they are installed in substantially parallel relationship with inner trays 12. Preferably they are the same in length as trays 12, as shown in FIGURE 1. In the illustrated embodiment, each tray 14 comprises an elongated channel member having a base 170 with an integral central reinforcing rib 172 and two upstanding spaced walls 174. Preferably, tray 14 is an extrusion formed from a light weight metal such as aluminum or an aluminum alloy, which provides great strength with a minimum of weight.

As shown in FIGURE 14, a plurality of transverse low friction or ball bearing rollers 176 are supported in longitudinally spaced relation on shafts 178 mounted in spaced walls 174. The arrangement and spacing of rollers 176 in trays 14 are substantially the same as that of rollers 11 in trays 12 for mutual coaction. It will be appreciated that rollers 11 and 176 are supported in their respective trays in such manner that they provide a rolling surface upon which pallets 8 may be moved into and out of selected transportation locations in a carrier.

Longitudinally spaced brackets 180 attached to the exterior of one wall 174, see FIGURE 14, provide means for detachably securing trays 14 to the floor of airplane 2, as in the case of trays 12. Brackets 180 have angularly extending portions 182 in which are operatively mounted locking fittings 36, of the type described hereinabove (see FIGURE 6). Handle 58 when positioned as shown in FIGURE 14, in engagement with spring part 62, maintain tray 14 in detachably secured coaction with seat rail 18.

The walls 174 of trays 14 are provided with transversely aligned, preferably equidistantly spaced, sets of recesses 184 through which extend shanks 186 of T-shaped guide members 188, see FIGURES 1, 14 and 15. The number of sets of recesses 184 will depend upon the length of a tray 14 and the number of side guide members 188 which are required to contain the side loads to which they will be subjected. The inner or guide face 190 of each head 192 of members 188 is flat and lies in a plane at right angles to an adjacent flat face 191 on shank 186 and the longitudinal axis of shanks 186. Thus, when members 188 are installed as shown in FIGURES 1 and 14, guide faces 190 lie in the same vertical plane in order to provide a satisfactory abutment and serve as guides for pallets 8 resting upon the roller conveyor trays 12 and 14 of system S, as they are loaded and unloaded in aircraft 2.

T-shaped guide members 188 are the same in construction and hence only one need be described in detail. Referring to FIGURES 14 and 15 it will be seen that the base of head 192 and the free end of shank 186 are flat and coplanar. Hence when each member 188 is installed, its guide face 190 lies in a plane substantially normal to the floor of the carrier, i.e., airplane 2. Base 194 of the free end of shank 186 mounts a tension fitting 196 secured therein in any suitable manner, as by screws (not shown). When installed in airplane 2, the head 198 of fitting 196 is located beneath opposed abutments 200 of plate 202 suitably attached to the aircraft. As shown in FIGURE 14, each seat plate 202 is provided with a circular opening 201 connecting with abutments 200, the arrangement corresponding to a short section of seat rail 18.

Base 204 of head 192 carries two sets of locking fitting 206 projecting downwardly therefrom for coaction with seat rails 18. Each set of locking fittings comprises two spaced tension members 208 with a vertically movable cylindrical shear head 210 located therebetween. Tension fitting members 208 have heads 209 adapted to be seated in locking engagement beneath opposed abutments 21 in seat rail 18. Shear head 210 normally is maintained in outwardly projecting arrangement with the bottom face of head 192 of a T-shaped guide member against the action of a spring 212 which encircles a pin 213 attached to head 210 and extending upwardly through head 192. Spring 212 bears against the upper end 214 of bore 216 in head 192 and against the upper surface 218 of head 210. A handle 220 carried by pin 213 provides means for moving shear head 210 upwardly in head 192 such that members 208 can be inserted in openings 19 in a seat rail 18 at which time the T-shaped guide member can be shifted so as to dispose heads 209 of tension members 208 beneath abutments 21, whereupon when handle 220 is released, shear head 210 is seated in an opening 19 and T-shaped member now is locked in seat rail 18 in its desired installed position, with the head 198 of a tension fitting 196 also engaged beneath abutments 200. It will be appreciated that when a T-shaped guide member 188 is being installed both handles 220 are operated so that tension members 208 can be inserted freely into the openings in a seat rail 18. Arcuate cut-out sections on opposite sides of shear heads 210 allow these heads to partially encircle reduced shank portions of members 208 in known manner, thereby preventing rotation of handles 220.

In some cases it may be desirable to tie cargo securing belts, ropes, and the like to securing members. For this reason, each T-shaped member 188 is provided with a threaded bore 221 in which the threaded shank 223 of a tie ring 225 can be screwed to mount ring 225 thereon.

In loading and unloading a carrier, such as an airplane 2, it is important that no damage occur to the aircraft. This is especially true in the case of a jet airplane which flies at great heights where it is necessary to do all possible to protect the door, and the door sill C from damage which might cause loss of pressure during flight. This problem has been solved by the present invention by the provision of novel apparatus which insures that cargo can be loaded and unloaded not only without damage to the aircraft, but also with great rapidity and dispatch.

FIGURES 1, 16, 17 and 19–23 inclusive illustrate a preferred embodiment of entrance guide and sill protecting apparatus, designated generally 222. As viewed in these figures there are a left end section 224, a central section 226 and a right end section 228. It will be appreciated that the number, width and length of the sections constituting apparatus 222 can be varied to meet the requirements of a given carrier, such as airplane 2.

In section 224, shown in FIGURES 19–23, there is provided an elongated angle member 230 to one end of which is attached a bracket 232 which supports a plurality of, in this case three, rollers 234 rotatably supported on shafts 236 journalled in horizontal vertical spaced flanges 235 formed in bracket 232. Mounted on an outwardly diverging end portion 233 and attached thereto in any suitable manner is a vertical wall or guide plate 238 which serves as an entry guide for pallets to be loaded from a point of delivery 240 (FIGURE 1) from any type of suitable conventional delivery device into airplane 2. A plurality of vertical plates 242 positioned between rollers 234 which extend outwardly from bracket 232 therebetween, are attached to flanges 235. Plate 238, rollers 234 and plates 242 constitute a side guide 243 for insuring the proper loading and unloading of pallets 8 in airplane 2. A similar side guide 244 forms a part of right end section 228, and further detailed description thereof is considered to be unnecessary.

Sections 224, 226 and 228 are provided with one or more roller conveyor trays 246 depending upon the width of cargo loading opening. Their length will vary in accordance with the space between the sill C and the first roller mat 15, or in other words the type of airplane in which system S is installed. In the form of the invention illustrated, section 224 is provided with one elongated roller conveyor tray 246 having the same general structural design as a typical tray 12 disclosed in FIGURES 2 and 3. In cross section, through a cross member 248 which is formed integrally with side channels or channel portons 250, tray 246 resembles the same flat V as that in a tray 12. As illustrated in FIGURES 16 and 20, the spaced channel portions 250 at one end of tray 246 are attached, as by welding, to the long leg 252 of angle member 230. A shaft 253 having its ends mounted in walls 247 of channel portions 250 rockably supports an entry roller assembly unit 254 comprising side plates 256 in which are secured spaced shafts 258 rotatably supporting low friction rollers 260, similar in construction to rollers 11, described hereinabove. Leg 252 of angle member 230 is provided with a cut-out section 262 and a beveled face 264 beneath the outer roller 260 of assembly 254 in order that it may rock up and down, and thereby best accommodate a loaded pallet without cresting during loading and unloading operations. Washers 266 encircling shaft 253 maintain assembly 254 in proper centered relationship between channel portions 250.

Tray 246 is provided with three transverse low friction rollers 267, 268 and 269, similar in construction and operation to rollers 11, rotatably supported on shafts having their ends suported in walls 247 of channel portions 250. Rollers 268 and 269 are shorter than roller 267 because they operate between the side arms 271 of treadle frame 270, pivotally supported on shaft 272, the ends of which are mounted in walls 247 of channel portions 250 (FIGURE 23). Treadle frame 270 is provided with a rear portion 274 and a front portion 276 having a beveled transverse lower face 277 adapted to coact with a complementary bevel 278 on cross plate 280 which joins the free ends of channel portions 250 (see FIGURES 17–19). Treadle frame 270 normally is biased by springs 282 encircling shaft 272, on opposite sides of arms 271, as shown in FIGURE 23, so as to dispose the front portion 276 upwardly above upper faces of channel portions 250, as illustrated in FIGURE 17. The ends of springs are secured respectively in frame 270 and channel portions 250 (FIGURE 23). In this manner nose 284 of treadle frame 270 provides with the other similar frames 270 a positive stop means which prevent a loaded pallet in airplane 2, at loading station 6, from any possibility of rolling backwardly out of the aircraft.

Side arms 271 of treadle frame 270 are formed with arcuate slots 286 through which shaft 288, which supports roller 269 extends. These slots provide for proper swinging movement of treadle frame 270.

Arms 271 also are provided with recesses in which are located the rounded heads of screws 292. These rounded heads of screws 292 coact with detent pins 294 yieldably mounted in detent supports 296, similar to those shown in FIGURES 9 and 10, mounted in channel portions 250 of trays 246, and held therein by suitable conventional lock nuts 298. The purpose of the detent mechanism just described is to insure that treadle frame 270 can be held in an inoperative position whenever it is desired to turn a loaded pallet on roller mats, designated generally M, at the loading station in the aircraft or to move a pallet through opening 6 out of the airplane. The normal position of treadle frame 270 is that shown in FIGURE 17. When so positioned a loaded pallet can be moved along trays 246 into the aircraft and onto roller mats M, and noses 284 of the several treadle frames will be positioned as shown in FIGURE 17 to prevent retrograde movement of the pallet. The arrangement of the detent mechanism is such that the treadle frames can move downwardly as a pallet is pushed thereover without any locking coaction between pins 294 and headed screws 292. When it is desired to dispose the several treadle frames in operative position below the operating level of the rollers of trays 246, each treadle frame 270 is individually pushed downwardly until it is held by its respective detent mechanism against upward movement. Each frame 270 remains in locked inoperative position until the detent mechanism is incapacitated by a firm tap applied to the rear portion of each treadle frame, whereupon springs 282 return the treadle frames to the position shown in FIGURE 17.

Referring to FIGURES 16, 17 and 20, it will be seen that a plurality of brackets 300 are mounted preferably in equidistantly spaced relationship on the underside of angle member 230, which member also is formed with an elongated bead 302 which rests against the sill portion of airplane 2. Each bracket 300 is provided with a tapered leg 304 complementary in angularity with the inclination of sill C (see FIGURE 17). As shown in FIGURE 17, leg 231 of angle member 230 extends downwardly over sill C and affords thereby added protection against damage. In this way provision is made to insure the proper installed disposition of a unit 224, and also its complementary units 226 and 228.

Unit 224, and units 226 and 228 are provided with locking fittings 36 by means of which they are detachably secured to seat rails 18, in the same manner as trays 12 and 14, described hereinabove. Shear fittings in the form of studs 306 attached to the underside of cross plate 280 seated in openings 19 in seat rail 18 position the free end of each tray 246 in a selected seat rail 18.

Section 228 is essentially the same in construction as section 224, except that it is shown as provided with a minimum of two trays 246. Bracket 237 is the counterpart in construction to bracket 232 except that it is located at the right-hand end of angle member 230. Center section 226 is the same in construction as sections 224 and 228 except that it is not provided with any brackets 232 or 237. In the drawings, FIGURE 16, central section 226 is provided with a minimum of three trays 246. Since each tray 246 and its associated mechanism are the same in construction, several trays 246 have been shown in diagrammatic form, and only one has been described in detail.

The entrance guide and sill protecting apparatus 222 is removed after the aircraft or other carrier is loaded. This removal is effected by moving the actuating handles 58 of the several locking fittings 36 and lifting units 224, 226 and 228 out of seat rails 18. These several units can be stored in a suitable space in the carrier vehicle for transportation along with the cargo, or left at the loading station, as desired.

In the preferred embodiment of the invention illustrated in FIGURE 1, system S comprises outer trays 14, inner trays 12, and T-shaped guide members 188. Thus, in the system S shown in FIGURE 1, the construction is designed for use with pallets 8 of a single width, although because of the novel locking units 25, any length of pallet can be used as long as they conform to practical and efficient requirements of loading and transportation. In FIGURE 1, pallets having a width of say 108 inches, or 125 inches could be used, depending upon the width of the cargo space in which a system S is installed.

Under certain conditions, and in order to meet varying loading requirements, it may be desirable to load a carrier, such as airplane 2, with pallets 108 and also 125 inches in width, rather than a single width. These conditions and requirements are met by the modified form of the invention shown in FIGURES 24, 25, 26 and 27. In FIGURE 24, the construction of trays 12 and 14 is the same as that described hereinabove and shown in FIGURES 1, 2, 3, 7, 14 and 15, except that additional mechanism is provided which makes it possible to convert from a system which can transport pallets 125 inches in width to one capable of transproting pallets 108 inches in width, or one in which pallets of both widths can be handled and transported equally well. It is to be understood that the pallet widths mentioned are merely illustrative, since pallets of other widths also could be used satisfactorily.

In FIGURE 24, trays 12 and 14 are detachably secured to seat rails 18 extending along the aircraft seat rails indicated in broken lines, as in FIGURE 1. Any suitable number of inner trays 12 can be provided depending upon the width of the airplane. Trays 14 are similarly installed in the aircraft, as are T-shaped guide members 188. The basic installation shown is arranged to handle the widest pallet. This is indicated as position A. Assume that the pallet for position A is 125 inches in width.

Now assume that it is desired to convert system S to one capable of handling pallets, say 108 inches wide. This can be done by using position B in which case inner tray 310, which is essentially the same in construction as a typical tray 12, now becomes a guide tray as well as a conveying and locking or hold-down tray. Outer or guide tray 14 at position A is not used. It should be apparent that inner tray 310 could be substituted in any one or group of inner tray positions as shown in FIGURE 24 thus providing for a multiplicity of different width pallets or cargo units.

Tray 310 is detachably secured to its respective seat rail 18 by locking fittings 36 mounted in cross members 30 such as described hereinabove, and shown in FIGURES 6 and 7. It will be appreciated that although only one bay is shown in FIGURE 24, the installation of tracks 10 comprising trays 12, 14 and 310 is generally the same as illustrated in FIGURE 1. The number of trays forming each track 10 can vary in the same manner as described hereinabove depending upon the width of the carrier and the length of the cargo carrying area.

In tray 310, shown in FIGURE 24, one locking unit 25 is mounted at the extreme left end thereof. This locking unit forms one of a series of transversely aligned locking units 25 detachably mounted in trays 12. Additional locking units 25 can be used, as shown in FIGURE 1, depending upon the length of the tray, and positioning requirements necessary to secure a given pallet 8 against movement. In addition to one locking unit 25, tray 310 also is provided with three auxiliary guide units 312 which are so constructed that, as in the case of dogs 22 and 24 of a locking unit 25, their guide arms 340 when in inoperative positions are disposed beneath the operative supporting level of rollers 11 thereby enabling loaded pallets 8 to be moved to predetermined travel positions i.e., I–VI, as viewed in FIGURE 1 without interference. See FIGURES 26 and 27.

Each guide unit 312 is so constructed that it, like a locking unit 25, can be detachably supported in a tray 310, as also in a tray 12. It is preferred to provide additional securing means for tray 310 in order to insure proper lateral support for a pallet bearing against guide arms 340. Referring to FIGURES 24 and 25, it will be be seen that one channel portion 250 of a tray 310 is provided with a plurality of hold down arms or brackets 314 preferably attached thereto by pins 316 at locations preferably corresponding to the positions of cross members 30. At its free end each bracket 314 supports an adjustable threaded headed tension fitting 318 adapted to engage with the undersides of opposed abutments 320 formed in plates 322 suitably attached to the aircraft. In the installation of each tray 310 which constitute a track 10, fittings 318 are inserted into circular openings 324 of plates 322. The tray is then moved longitudinally until the head of each fitting 318 is disposed beneath abutments 320. The locking operation of fittings 36 is the same as described hereinabove.

FIGURES 26 and 27 illustrate a preferred form of auxiliary guide unit 312 which can be detachably mounted on studs 70 and holes 74 in channel portions 250 of each tray 310. The number of units 312 which are used depends upon the size and weight of a load on a pallet 8, and its length.

Since all auxiliary units 312 are the same, only one need be described in detail. Referring to FIGURES 26 and 27, each unit 312 comprises a frame 326 having side plates 327 joined by integral cross members 328 and 329. The latter is provided with two laterally spaced extensions 330 having bores, which with axially aligned bores in side plates 327, slidably support short shafts 332. The outer ends of shafts 332 project outwardly beyond side plates 327 in order to seat in holes 74 formed in channel portions 250 of trays 310. The inner ends of shafts 332 pass through the bores in extensions 330 and are provided with gripping pins 334 which secure shafts in assembled relationship in each unit 312 and enable a mechanic, when installing or removing a guide unit 312, to press them towards each other against the tension of springs 336 encircling short shafts 332 between plates 327 and extensions 330 in order to retract the free ends of shafts 32 either to withdraw them from holes 74 or allow springs 36 to maintain them seated in holes 74 when a unit 312 is installed. The other ends, as viewed in FIGURE 26, are provided with openings 338 and guide surfaces (not shown) corresponding to similar openings 94 and guide surfaces 96 in locking units 25 shown in FIGURES 8 and 9. The method of installing and removing a guide unit 312 is the same as that described for a locking unit.

Each auxiliary guide unit 321 is provided with a guide arm 340 pivotally mounted on shaft 342 supported in cross members 328 and 329. Arm 340 is provided with a flat guide face 344 which not only guides a pallet 8 but also provides a lateral support against which a pallet can press. Arm 340 also is formed with a latch nose 346 which coacts with a complementary locking groove 348 formed in a latch lever 350 pivotally mounted on shaft 352 supported by cross members 328, 329. A tension spring 354 encircling shaft 352 and having one end bearing against the underside of one of side plates 327 and its other end pressing against the underside of lever 350 braces lever 350 with locking relationship with nose 346. This coaction maintains arm 346 in its guiding position as shown in FIGURE 27.

Under some operating conditions it may be found advantageous to use inner trays which coact with trays 12 to form the front and/or rear terminal portions of tracks 10 wherein each tray is provided at one end only with a rigidly attached stationary hold down dog. Referring to FIGURES 1, 28 and 29, which illustrate this embodiment of the invention, it will be seen that the four terminal trays 12A each are provided with a fixedly supported dog 356. In this instance these trays 12A constitute the rear terminal portions of tracks 10. Each dog 356 is formed with a substantially horizontal locking member 358 which engages with the rear end of a pallet 8. Dogs 356 on terminal trays, and dogs 24 on locking unit 25 comprise the locking means for maintaining the rearmost pallet 8 in its predetermined location for transportation. If trays 12 mounting dogs 356 were installed at the front of the carrier, i.e., airplane 2, then dogs 22 and 356 would coact to secure the frontmost pallet 8 for transportation. As shown in FIGURES 28 and 29, dogs 356 form a part of a bracket 357 attached by bolts 360 to walls 32 of channel portions 250. The base of bracket 357 is provided with tension fittings 362 which fit in seat rails 18 as described hereinabove.

Locking fittings 364 are mounted in cross members 30 of trays 12A as shown in FIGURES 28, 29 and 30. All fittings 364 are the same in construction and operation, and, therefore, only one need be described in detail. Cross member 30 (FIGURE 30) is provided with a central bore 365 in which slides a shear head 366 carried by pin 368 which extends upwardly through a hole in cap plate 370 secured by screws 371 to cross member 30. Tension spring 372 encircling pin 368 between the underside of cap plate 370 and the upper surface of shear head 366 tends normally to bias shear head 366 downwardly beyond the lower face of cross member 30 for seating in a selected aperture 19 in a seat rail 18. Shear head 366 is provided with an arcuate cut-out portion 374 which partially encircles enlarged shank element 376 of tension fitting head 378 and prevents head 366 from rotating. Tension fitting head 378 is supported fixedly in member 30 by means of screw 380, and is adapted to be secured in locking relationship beneath opposed abutments 21 of a seat rail 18 in the same manner as tension fitting heads 209, described hereinabove.

Each shear head 366 is moved to its retracted or inoperative position, shown in FIGURE 30, by means of an actuating lever 382, having an actuating arm 381 and bifurcated lower legs 383, pivotally mounted at 384 on pin 368. In the position shown, the lower legs 383 of lever 382 engage the top of cap plate 370 and maintain shear head 366 in its retracted position. However, when a tray 12A is to be installed, it is so positioned and moved with respect to its selected seat rail 18 that all its tension fitting heads 362 and 378 are located beneath abutments 21. At this time, all actuating arms 381 of levers 382 are pushed to the left or to the right, as viewed in FIGURE 30, whereupon springs 372 force shear heads 366 downwardly into apertures 19 of the seat rail 18, whereby it is detachably and securely attached to the seat rail. A tray 12A can be removed merely by reversing the operation just described.

In FIGURES 1 and 31, an arrangement is shown which in accordance with the invention makes it possible to insure proper guiding and securing of cargo in cases where a seat rail is mounted in a skewed or diagonal manner in an aircraft. In a situation such as this, one or both outer guide tracks 10 comprising at least one guide tray 14 in a skewed zone is so constructed that the several guide members corresponding to T-shaped guide members 188 are mounted thereon such that their vertical guide faces or surfaces lie in the same vertical plane as all of the corresponding vertical faces or surfaces 190 of the several tandemly arranged trays 14 constituting an outer track 10.

Because of the fact that each T-shaped guide member 386 in a modified outer tray 14A may vary somewhat in order to insure the necessary planar arrangement of guide faces 388 thereof, they are attached to guide rail 14A, as by bolts or rivets 390. Each guide member 386 is generally the same as members 188, and is provided with a shank 392, a free end 394 with tension fitting head 395 seated in a plate 202 and a head portion 396 having shear fittings 366 and tension fittings 402 referred to hereinafter, all constructed and operating in the same general manner as T-shaped guides 188, except that the latter are not fastened to trays 14.

The modified trays 14A are of the same construction as trays 14 as to cross section, rollers 176 and mounts therefor. They are provided with larger recesses and cut-outs 398 and 400, than cut-outs 74, in order to accommodate modified T-shaped guide members 386. Appropriately spaced tension fittings 402 project outwardly from the bottom flat face of head portions of members 386. These fittings are in predetermined spaced relationship with shear fittings 366 mounted in head portions 396 which are similar in construction and operations as locking fittings 364 shown in FIGURE 30 and described hereinabove. The operative and inoperative positions of shear heads 366 are the same as in the structure shown in FIGURE 30. Actuating arms 381 effect the desired retraction or entry of shear heads out of or into apertures 19 of a selected seat rail 18, when removing or installing a tray 14A. This type of locking fitting is of considerable assistance to a mechanic when installing or removing a tray. This is because all actuating arms 381 can be locked up so that the several tension fittings can be seated beneath or moved out of engagement with abutments 21 without concern as to positioning of shear heads 366.

In the case of T-shaped guide shown at the extreme right in FIGURES 31 and 32, because of the fact that the main part of head portion 396 is disposed outside tray 14A and there is a minimum of space available at this position in the installation or removal of tray 14A, an operating pin 405 pivotally connected to pin 368 is substituted for lever 381. Pin 405 projects from its pivotal connection to pin 368 through a hole formed in wall 382 of head portion 396 of tray 14A. Thus merely by pressing downwardly on the free end of pin 405, the position of shear head 366 can be controlled as desired. It will be appreciated that in installing or removing a tray 14A provided with a special locking fitting using an actuating arm or pin 405, all actuating arms 381, are disposed as shown in FIGURE 30. Hence the only locking element which must be operated manually at this time is locking pin 405. The need for providing this special locking pin 405 will depend upon the length of a tray 14A, and the amount of space available for its installation. As in the case of T-shaped guide members 188, members 386 are provided with cylindrical bases 406 having tapped extensions 408 in heads 396 in which tie down rings 225 can be mounted.

Referring to FIGURES 1, 18, 18A and 33-35 the invention comprises novel loading and unloading mechanism for effecting the satisfactory movement of pallets 8 into and out of airplane 2, as described hereinabove, pallets 8 are moved over entrance guide and sill protecting apparatus 222 onto inner and outer roller or ball mats 13 and 15, respectively, which, as shown in FIGURE 1 are mounted on opposite sides of trays 12. Balls 407 on roller mats 13 and 15 project upwardly therefrom and provide a roller platform which not only supports loaded pallets for easy movement, but also allows them to be turned and moved about as required in being pushed to their flight positions. Trays 12 are the same in construction as trays 12 described heretofore except that they are not provided with rollers 11 which would interfere with the free movement of pallets 8 on the roller mats. Roller mats 13 (15) and the general construction thereof may be considered as of conventional design. Rollers or balls 407 are supported in the same general manner as balls 308 disclosed in FIGURE 18 of my above referred to copending application, Serial No. 260,931, now Patent No. 3,193,606, and are pressed upwardly by springs 409 into desired operative positions.

Ball housings 410 are located in frame 416 by retainer caps 412. Supports 416 are connected by a panel member 414 and a base plate 418 to which are attached brackets 420. These brackets have portions which are seated beneath channel positions 250 of trays 12 and are held in operation thereby. Frame 416 is provided with support portions 422 which are encircled by the lower ends of springs 409. The outer portion of frames 416 of mats 13 are also secured to the floor of the aircraft by extending portions (not shown), essentially similar in purpose to brackets 420 which extend under shank of T-shaped guide member 430, FIGURES 33-35, hereinafter described. Panel member 414 serves the further purpose of providing a platform into which ball or roller 407 and ball housing 410 may be depressed by foot pressure thus enabling those who are loading the carrier to walk about in safety. Springs 408 are of appropriate strength, and balls 407 are in sufficient number to permit this depression under the concentrated weight of a human being while at the same time providing sufficient support to the less concentrated though considerably heavier palletized load to maintain it at a level above the stationary surface of cross member 414 to permit free movement of load in the carrier.

In order to make it possible for those who are loading a carrier, such as airplane 2, to walk about, especially at the loading station, U-shaped floor plates 421 are detachably secured to studs 70 of trays 12 at that station, see FIGURES 18 and 18A. Plates 421 extend along these trays in the space between channel portions 250. Their opposite legs 423 are provided with arcuate cut-out portions (not shown) such that a plate can be position with one end resting on the two opposed studs 70 at the end of a tray 12 and when the plate is swung downwardly using those studs or pivots, the other cut-out portions on the plate come to rest upon the other studs 70 of that tray at one end, the opposite legs of each plate 421 so provided with springs 424 on which are mounted studs 426 designed to seat in holes 74 at the end of a tray 12, or at an intermediate part thereof, depending upon the length of each particular plate being installed. Usually each plate 421 is of a length equal to that of a tray 12 on which it is installed. However, if desired more than one such plate could be used. Each spring 424 is provided with a finger grip extension 428 by means of which, when a plate is being installed or removed, studs 426 may either be withdrawn for positioning in holes 74 or for removing the plate on which they are mounted.

As described hereinabove, apparatus 222 is removed after an aircraft has been loaded. In order to provide against lateral movement of a loaded pallet 8 locked in flight position at the loading station complementary guide units 430 are provided, see FIGURES 1 and 33-36. These units correspond generally with guide members 188 in their construction and method of mounting in airplane 2. They are, however, so formed that when the carrier is being loaded or unloaded, their guiding and side movement preventing members are located in inoperative positions in order that cargo can be moved thereover into and out of the aircraft, as the case may be.

As shown in FIGURE 1, units 430 preferably are aligned transversely with T-shaped guide members 188.

Each unit 430 is the same in construction and function and therefore a description of one will suffice. It is formed in general T-shape with a head 432 and shank or leg 434. The head and shank are detachably secured to the floor of the aircraft by the same means as guide members 386, i.e., tension fittings 395 and plates 202 and locking fittings 364, see FIGURES 30 and 31.

Head 432 pivotally supports on pin 433 a guide and locking block 436 provided with a flat guide and support face 438 for preventing lateral movement of a loaded pallet 8 resting on ball mats 13 and 15 between T-shaped guide members 188 and blocks 436 of guide units 430. Head 432 is formed with a cut-out portion 440 having an arcuate section 442 which allows back 436 to be moved from an inoperative position wherein its top edge lies flush with the top edge of head 430 to the full line operative position shown in FIGURES 33, 34 and 35. In this manner, loaded pallets 8 can be moved into and out of an aircraft without obstructions by blocks 436. However, when blocks 436 occupy their operative positions they provide an effective support against movement of a pallet 8 out of the aircraft.

Block 436 is maintained in its operative position by means of a detent pin 444 slidably mounted in bore 446 in head 432. Pin 444 is urged by spring 448 into a complementary bore 450 in block 436. When it is desired to swing block 436 into its inoperative position in cut-out portion 440, the mechanic merely presses button 452 slidably mounted in block 436. Button 452 which forms a part of a pin 454 slidably mounted in bore 450 when so pressed carries pin 454 to move detent pin 444 out of bore 450 whereupon block 438 is free to be turned to its inoperative position.

It will be clear from what has been said above that a system constructed in accordance with and embodying the invention is one which makes it possible to accommodate different lengths of pallets in selected positions on the tracks of the system, where they may be secured by locking units 25, in consecutive, adjacent, tandem arrangement, or in spaced out arrangement, and also in random combinations thereof. The novel results obtained by the invention are due in a large measure to the manner in which the mounting supports of the locking dogs are provided in the tracks forming part of the system. The pitch or spacing of the mounting supports in the tracks is so established as to detachably support the locking dog units 25 on selected mounting supports at spaced intervals of which the length of an associated pallet plus the width of the locking dogs, shown diagrammatically at "$w$" in FIGURE 4, is a multiple. In accordance with the invention, the spacing or frequency of rollers 11 are selected to permit this mounting support arrangement for the locking dog units 25 while at the same time providing continuous support for the pallet. The purpose of the above described selective spacing of the locking units constitutes a highly important part of the invention since it provides for securing the pallets within the aircraft such that optimum disposition of the total load with respect to the center of balance of the aircraft can be readily accomplished.

It will also be apparent that the invention provides a novel cargo handling system in which the walls of the trays in which the locking assembly units 25 and the low friction conveying pallet supporting means, i.e., rollers 11, are supported above the floor and form a bridge between supports 30 which permits the distribution of loads caused by the weight of a loaded pallet 8 or by the weight of such pallet acting under the various inertial forces which are imposed on the floor of the carrier in discrete selected positions or intervals most advantageous to the carrier structure. In other words, the construction of each tray 12 and 14, especially those trays which are provided with locking dog assemblies 25, are formed with bearing points or supports located at discrete positions, i.e., cross members 30, therein, such that all forces or loads imposed by cargo units supported by and secured on the system coacting with the locking dog assemblies are transmitted to selected bearing areas, points or locations on the carrier floor and to the framework of the aircraft.

While reference hereinabove has been made to the handling of cargo as supported on or carried by pallets, it will be understood that a system embodying the invention can readily and satisfactorily handle cargo loaded in containers which are provided with suitable complementary means for coacting with locking dogs 22 and 24. In general, therefore, cargo so handled can be designated unitized cargo or cargo units.

What is claimed is:

1. A cargo handling and restraining system for use in the transportation of cargo units in a carrier having a cargo supporting floor and an entrance through which said cargo units may be loaded and unloaded, comprising a plurality of tracks extending along said floor and longitudinally thereof, each of said tracks including mounting supports provided at longitudinally spaced intervals along said tracks, a plurality of cargo unit supporting low friction conveying surfaces carried by each of said tracks and providing a substantially continuous support for each cargo unit for movement to a position for transportation in said carrier, a plurality of sets of movable locking members mounted for movement from inoperative positions below the supporting plane of said tracks into operative positions thereabove securing each of said cargo units against substantial longitudinal and vertical movement on said tracks relative to said floor of said carrier, and means detachably securing said sets of locking members to said mounting supports in transverse alignment in selected operative positions on said tracks.

2. A cargo handling and restraining system for use in the transportation of cargo units in a carrier having a cargo supporting floor and an entrance through which said cargo units may be loaded and unloaded, comprising a plurality of tracks extending along said floor and longitudinally thereof, a plurality of cargo unit supporting low friction conveying surfaces carried by each of said tracks and providing a substantially continuous support for each cargo unit for movement to a position for transportation in said carrier, a plurality of transversely aligned locking means securing each of said cargo units against substantial longitudinal and vertical movement on said tracks relative to said floor of said carrier, means detachably mounting said locking means in selected operative positions on said tracks, an infeed conveyor system, means mounting said infeed system adjacent the loading entrance of said carrier whereby cargo units can be delivered on said system onto said longitudinally extending tracks, stop means associated with said infeed conveyor system for allowing movement of said cargo units into said carrier and preventing undesired retrograde movement of cargo units thereon, and mechanism for incapacitating said stop means to permit cargo units to be moved in a reverse direction over said stop means for removal from said carrier.

3. The invention defined in claim 2, wherein said infeed conveyor system comprises a plurality of spaced trays located substantially at right angles to said longitudinal tracks, at least one low friction roller carried by each of said trays, and means detachably securing said trays to the floor of said carrier.

4. The invention defined in claim 3 wherein said means for preventing retrograde movement of a cargo unit on said infeed conveyor trays comprises a lock member carried by each of said trays, and resilient means normally biasing each of said lock members upwardly to provide a barrier against rearward movement of a cargo unit after said cargo unit has been moved on said trays onto said tracks depressing said lock members while passing thereover, after which said members are moved upwardly by said biasing means.

5. A cargo handling and restraining system for use in the transportation of loaded pallets in a carrier having a cargo supporting floor and an opening through which said loaded pallets may be loaded into said carrier, comprising a plurality of tracks extending along the floor and longitudinally thereof, means securing said tracks to said floor, said tracks comprising a plurality of laterally spaced inner cargo supporting tracks and an outer supporting track located in laterally spaced relation to each of the outermost inner tracks, a plurality of pallet supporting low friction rollers carried by each of said tracks and longitudinally spaced therealong for supporting each pallet for movement to a position for transportation in said carrier, a net containing said cargo on each of said pallet, said net including substantially vertically disposed tapes having securing rings at the lowermost terminal ends thereof, a plurality of transversely aligned locking units for securing each of said pallets against substantial longitudinal movement on said tracks relative to said floor of said carrier, each of said tracks having a plurality of locking stations provided at longitudinally spaced positions along its length, means detachably mounting said locking units at selected transversely aligned locking stations on said tracks, and locking dogs carried by each of said units for engaging said securing rings and pallet and firmly holding said netted cargo on said pallet and said pallet to said floor of said carrier, whereby longitudinal movement of said cargo during all conditions of travel of said carrier is prevented.

6. A cargo handling restraining system for use in the transportation of preloaded pallets in a carrier having a cargo supporting floor and an opening through which said pallets may be loaded into said carrier, comprising in combination a plurality of tracks extending along the floor and longitudinally thereof, a plurality of pallet supporting low friction rollers carried by each of said tracks and spaced approximately equidistantly therealong for supporting each pallet for movement to a selected transportation station in said carrier, at least two of said tracks having a plurality of longitudinally spaced support mounts, transversely aligned locking units, each of said units comprising holding members movable from an inoperative position below said rollers whereby loaded pallets may be moved along said tracks to a selected transportation station without obstruction and into operative position relative to the front and/or rear of said loaded pallets to secure each of said pallets against substantial longitudinal and vertical movement on said tracks relative to said floor of said carrier, and means coacting with each of said units for detachably securing said locking units to selected support mounts at said selected transportation station on said tracks.

7. The invention defined in claim 5, wherein each of said outer tracks is provided with one or more sets of cut out sections spaced substantially along its length, guide means coacting with said outer tracks, said guide means having a portion extending across said outer tracks, and means for detachably securing each of said guide means to the floor of said plane.

8. A cargo handling apparatus for use in an airplane comprising outer pallet supporting tracks, means for mounting said tracks on the floor of said airplane to extend therealong in generally parallel spaced relation with each side wall of said airplane, a plurality of laterally spaced inner pallet supporting tracks mounted between and extending in generally parallel relationship with said outer tracks along the floor of said airplane, a plurality of pallet locking assembly units carried by said inner tracks in transverse alignment and providing thereby a transversely aligned spaced series of locking means movable from an inoperative position below the supporting plane of said tracks into an operative position thereabove for securing palleted loads supported by said tracks against substantial longitudinal movement, a plurality of sets of spaced lock support mounts provided in each of said inner tracks, and means carried by each of said units for detachably mounting each of said units in a selected set of support mounts in its respective track in selected aligned arrangement for coaction with a pallet to be secured on said tracks, whereby to satisfy the requirements of proper weight distribution in the airplane.

9. The invention defined in claim 8 including a plurality of side guides extending in spaced relationship along sad outer tracks, said guides having guiding faces lying in the same vertical plane to provide a vertical wall preventing lateral movement of a pallet secured on said tracks by said locking assembly units.

10. The invention defined in claim 9 wherein each of said tracks comprises a plurality of low friction conveying members mounted therein in substantially equidistantly spaced relationship, and each of said guides comprises a generally T-shaped member, wherein the head of said T is provided with a planar vertical guide and support face, and the shank of said T extends transversely through cut-out sections in the walls of said outer tracks, means on the heads and shanks of said T-shaped members for detachably securing said members in assembled relation to the floor of said airplane, and means carried by said outer guides for attaching them to the floor of said airplane.

11. The invention defined in claim 10, wherein said T-shaped guide members are permanently attached to an outer tracks, and means carried by said tracks and said T-shaped guide members for securing said tracks and said T-shaped guide members to the floor of said airplane.

12. The invention defined in claim 8, wherein each of said outer tracks comprises a plurality of generally U-shaped tandemly arranged trays, mounting one or more low friction rollers, in the upstanding legs of the U, and said upstanding legs of said U are provided with transversely aligned cut-out sections, pallet side guide members having portions extending through said cut-out portions and means for detachably securing said guide members and said outer support trays to the floor of said airplane.

13. A cargo handling and restraining system for use in the transportation of cargo units in a carrier having a cargo supporting floor and an entrance through which said cargo units are loaded and unloaded, comprising in combination a cargo maneuvering station comprising a plurality of tracks mounted on said floor and extending therealong, each of said tracks being provided with a plurality of longitudinally spaced support mounts, a plurality of ball mats positioned between said tracks, means attaching said tracks to said floor of said plane, means on said tracks maintaining said mats in operative position between said tracks with the balls of said mats projecting above said tracks to provide an omnidirectional low friction conveying means for cargo units being moved to and from said station and shifted for proper positioning for movement to a selected location in loading or unloading said carrier, and mechanism for securing a selected cargo unit against substantial longitudinal and vertical movement at said station, said mechanism including a plurality of locking assemblies, each assembly comprising at least one locking dog movable from an inoperative position below the supporting plane of said rollers upwardly into an operative position thereabove, and means detachably securing said assemblies to selected support mounts and in a selected aligned operative association with said tracks for locking engagement with said selected cargo unit.

14. In a cargo handling and restraining system for use in an aircraft having a cargo supporting deck and a loading and unloading entrance, the improvement comprising a conveyor apparatus extending over at least a part of said cargo supporting deck, said apparatus comprising a plurality of spaced substantially parallel sets of elongated tandemly arranged trays provided with low friction conveying means, means attaching said trays to said deck, a plurality of sets of spaced support mounts for each of said tracks, a plurality of locking assemblies for securing cargo units on said apparatus against substantial longitudinal and vertical movement, said assemblies comprising sets of movable locking members mounted for movement from inoperative positions below the supporting plane of said trays into operative positions thereabove, and means detachably securing said assemblies to selected support mounts in selected trays in a selected transversely aligned series spaced longitudinally from each other for engagement with complementary locking means on said cargo units to accommodate each selected size of cargo unit and secure it and said cargo against such movements.

15. The invention defined in claim 14 wherein said trays provided with said low friction conveying means and said locking assemblies comprise bearing supports positioned at discrete longitudinally spaced locations and so constructed and arranged that all forces imposed by cargo units secured on said apparatus by said locking assemblies are transmitted to selected bearing areas on said deck of said aircraft whereby to effect a desired distribution of the load into the framework of the aircraft.

16. The invention defined in claim 15, including side guides, means mounting said side guides in longitudinally spaced relationship exteriorly of and along the outermost runs of trays constituting said apparatus, said side guides having vertical planar faces for guiding a cargo unit and against which said unit may bear during transportation, and said side guide coacting with said locking assemblies restraining a cargo unit against substantial longitudinal and vertical movement during all conditions of flight and in landing to resist any attempt of said cargo unit to overturn.

17. The invention defined in claim 13 including tread plates carried by said tracks, and means detachably attaching said plates to said tracks.

18. A cargo handling restraining system for use in the transportation of preloaded pallets in a carrier having a cargo supporting floor and an opening through which said pallets may be loaded into said carrier, comprising in combination a plurality of tracks extending along the floor and longitudinally thereof, means securing said tracks to said floor, said tracks comprising a plurality of laterally spaced inner cargo loading tracks and an outer supporting track located in laterally spaced relation to the outermost of each of the inner tracks, a plurality of pallet supporting low friction rollers carried by each of said tracks and spaced approximately equidistantly therealong for supporting each pallet for movement to a position for transportation in said carrier, a plurality of transversely aligned locking units for securing each of said pallets against substantial longitudinal movement on said tracks relative to said floor of said carrier, means detachably mounting said locking units at selected operating positions, in said tracks, side guide members having substantially vertical guiding and lateral movement restraining means mounted to be engaged by opposite sides of a pallet restrained on said apparatus against substantial vertical and longitudinal movement by said locking units, and auxiliary guides carried by selected inner tracks to secure a pallet of narrower width against substantial lateral movement while so restrained.

19. The invention defined in claim 18, wherein said auxiliary guide assemblies are detachably mounted on said selected tracks and support means on said selected inner track or tracks for supporting said auxiliary guides.

20. The invention defined in claim 19, wherein each of said auxiliary guide assemblies is adapted to be disposed on said support means at longitudinally spaced selected positions and for selected lengths along said tracks, guide arms carried by said auxiliary guide assemblies normally disposed in inoperative positions relative to loaded pallets being moved on said tracks, and means for supporting said guide arms in operative position to restrain a selected narrower pallet between opposed sets of guide arms on said tracks.

21. The invention defined in claim 18 wherein said guide assemblies are detachably supported by said tracks, and wherein said tracks also detachably support locking dog assemblies for securing said pallets against substantial longitudinal and vertical movement, whereby a plurality of sizes of loaded pallets of different widths may be restrained against substantial longitudinal, vertical and lateral movement during all conditions of transportation.

22. A cargo handling restraining system for use in the transportation of preloaded pallets in a carrier having a cargo supporting floor and an opening through which said pallets may be loaded into said carrier, comprising in combination a plurality of tracks extending along the floor and longitudinally thereof, means securing said tracks to said floor, said tracks comprising a plurality of laterally spaced inner cargo loading tracks and an outer supporting track located in laterally spaced relation to the outermost of each of the inner tracks, a plurality of pallet supporting low friction rollers carried by each of said tracks and spaced approximately equidistantly therealong for supporting each pallet for movement to a position for transportation in said carrier, a plurality of transversely aligned locking units for securing each of said pallets against substantial longitudinal movement on said tracks relative to said floor of said carrier, means detachably mounting said locking units at selected operating positions, in said tracks, side guide members having substantially vertical guiding and lateral movement restraining means mounted along said outer tracks for engagement by the opposite sides of a pallet restrained by said locking units against substantial vertical and longitudinal movement and auxiliary guide members mounted on one of said inner tracks and coacting with said guide members extending along one of said outer tracks to secure a narrower pallet against substantial lateral movement while so restrained.

23. The invention defined in claim 8, wherein each of said inner tracks comprises an aligned tandem series of trays, auxiliary side guide assemblies, means detachably mounting a plurality of said auxiliary side guide assemblies in longitudinally spaced opposed coacting relation on selected tandemly aligned trays, guide arms carried by said of said assemblies, and means for maintaining corresponding opposed side guide arms of said assemblies positioned to engage the opposite sides of a pallet to substantially prevent lateral movement of said pallet on said trays.

24. The invention defined in claim 23, wherein said last named means comprises a latch lever, and resilient means for biasing said latch lever into engagement with guide arm to maintain it in operative position.

25. The invention defined in claim 13, including a loading and unloading system detachably mounted adjacent said entrance over which cargo units are moved into and out of said carrier, normally inoperative stop members mounted in longitudinally spaced relationship relative to said ball mat nearest said entrance, whereby cargo may be moved thereover into said carrier, stop arms carried by said stop members, means mounting said stop arms for movement into substantially vertical position relative to the floor of said carrier, and means for locking said stop arms in said position to provide a barrier against lateral movement of a cargo unit during transportation after said loading and unloading system has been removed from said carrier.

26. The invention defined in claim 1, including side guides extending exteriorly along the outermost of said tracks, auxiliary guides carried by selected inner tracks for adapting said system to handle narrower cargo units, said auxiliary guides including guiding means disposed in inoperatve positions beneath the plane of said conveying surfaces when said side guides are in use with wider cargo units, and means locking said auxiliary side guides in operative positions when narrower cargo units are to be handled and transported.

27. The invention defined in claim 6, including side guides mounted exteriorly of said outer supporting tracks, and auxiliary guides carried by selected inner tracks for selectively adapting said system to handle narrower pallets than those handled when said side guides are in use.

28. The invention defined in claim 6 wherein each of said tracks comprises one or more trays located in tandem arrangement, and each of said trays is provided with at least one friction roller, the spacing of said roller of each contiguous tandemly arranged tray being such as to provide continuity of roller support for pallets on said tracks, side guides mounted exteriorly of said outer supporting tracks for handling a given width of pallet, and auxiliary side guides detachably mounted on a selected tandem row or spaced tandem rows of inner trays, for converting said system to handle narrower pallets.

29. The invention defined in claim 28, wherein said selected trays detachably support both locking units and auxiliary side guides, whereby pallets of varying widths can be secured for transportation.

References Cited by the Examiner

UNITED STATES PATENTS

| | | | |
|---|---|---|---|
| 1,971,991 | 8/1934 | Roberston | 214—84 X |
| 2,334,124 | 11/1943 | Peterson | 214—84 |
| 2,351,314 | 6/1944 | Ario | 296—35 |
| 2,439,423 | 4/1948 | Fowler | 244—118 |
| 2,631,885 | 3/1953 | Ault | 296—35 |
| 2,710,105 | 6/1955 | Schwartz | 214—83.24 |
| 2,802,583 | 8/1957 | Dansereau | 214—84 |
| 2,811,240 | 10/1957 | Fenton | 214—514 X |
| 2,858,774 | 11/1958 | Batten | 214—38.8 X |
| 2,949,863 | 8/1960 | Cozzoli | 104—135 |
| 2,949,992 | 8/1960 | Weinberg | 214—84 X |
| 3,059,592 | 10/1962 | Cozzoli | 214—38.8 X |
| 3,088,568 | 5/1963 | Troy | 193—38 |
| 3,111,212 | 11/1963 | Garland et al. | 193—38 |
| 3,125,965 | 3/1964 | De Penti et al. | 296—35.1 X |

GERALD M. FORLENZA *Primary Examiner.*

A. J. MAKAY, *Assistant Examiner.*